US009723787B2

(12) United States Patent
Wafler et al.

(10) Patent No.: US 9,723,787 B2
(45) Date of Patent: Aug. 8, 2017

(54) FRUIT HARVESTER PLATFORM

(71) Applicants: Paul Wafler, Wolcott, NY (US);
Walter Wafler, Pittsford, NY (US);
Jeremy Bryant, Wolcott, NY (US);
Walter Bruce Prockter, North Rose, NY (US)

(72) Inventors: Paul Wafler, Wolcott, NY (US);
Walter Wafler, Pittsford, NY (US);
Jeremy Bryant, Wolcott, NY (US);
Walter Bruce Prockter, North Rose, NY (US)

(73) Assignee: Huron Fruit Systems, Inc., Pittsford, NY (US)

( * ) Notice: Subject to any disclaimer, the term of this patent is extended or adjusted under 35 U.S.C. 154(b) by 88 days.

(21) Appl. No.: 14/579,347

(22) Filed: Dec. 22, 2014

(65) Prior Publication Data
US 2015/0173296 A1 Jun. 25, 2015

Related U.S. Application Data

(60) Provisional application No. 61/920,079, filed on Dec. 23, 2013.

(51) Int. Cl.
E04G 1/00 (2006.01)
A01D 46/24 (2006.01)
A01D 46/20 (2006.01)

(52) U.S. Cl.
CPC .......... A01D 46/243 (2013.01); A01D 46/20 (2013.01)

(58) Field of Classification Search
CPC .............................. A01D 46/20; A01D 46/243
See application file for complete search history.

(56) References Cited

U.S. PATENT DOCUMENTS 3,861,535 A * 1/1975 Huxley, III .......... A01D 46/243
180/242
4,199,913 A * 4/1980 Hood ................... A01D 46/243
53/244

(Continued)

FOREIGN PATENT DOCUMENTS

WO 2010093638 A1 8/2010
WO 2014011035 A2 1/2014

OTHER PUBLICATIONS

International Search Report and Written Opinion for PCT/US2015/021969 mailed on Aug. 21, 2015.

Primary Examiner — Jerry Redman
(74) Attorney, Agent, or Firm — Brown & Michaels, PC

(57) ABSTRACT

A mobile picking platform system includes a mobile picking platform having a mobile carriage with a superstructure supporting multiple adjustable picking stations. A storage box carrier on the mobile picking platform has a pick position with storage boxes held at optimum heights for access by pickers on the picking stations, an unload position in which full storage boxes are unloaded onto a ground surface, and a load position for receiving empty storage boxes.

A storage unit carries empty storage boxes and facilitates transfer of storage boxes to the mobile picking platform. A shuttle trailer may also be included in the system to transfer empty storage boxes to the mobile picking platform and storage unit. The shuttle trailer has a down position in which full storage boxes may be picked up from a ground surface, and an up position for transferring storage boxes to the storage unit or mobile picking platform.

27 Claims, 34 Drawing Sheets

(56) References Cited

U.S. PATENT DOCUMENTS

| | | | |
|---|---|---|---|
| 4,234,203 A | 11/1980 | Johnson | |
| 4,590,739 A | 5/1986 | Abatti et al. | |
| 4,876,844 A * | 10/1989 | Grey | A01D 46/243 53/391 |
| 5,228,279 A * | 7/1993 | McKenna, Jr. | A01D 46/243 56/328.1 |
| 5,599,157 A * | 2/1997 | Ellington | A01D 46/243 414/460 |
| 2002/0017429 A1 * | 2/2002 | McCowan | A01D 46/243 182/63.1 |
| 2007/0050116 A1 * | 3/2007 | Jernigan | A01D 46/243 701/50 |
| 2007/0113531 A1 * | 5/2007 | Maconachy | A01D 45/001 56/13.9 |
| 2010/0303596 A1 | 12/2010 | Dagorret | |
| 2014/0331629 A1 | 11/2014 | Dagorret | |

\* cited by examiner

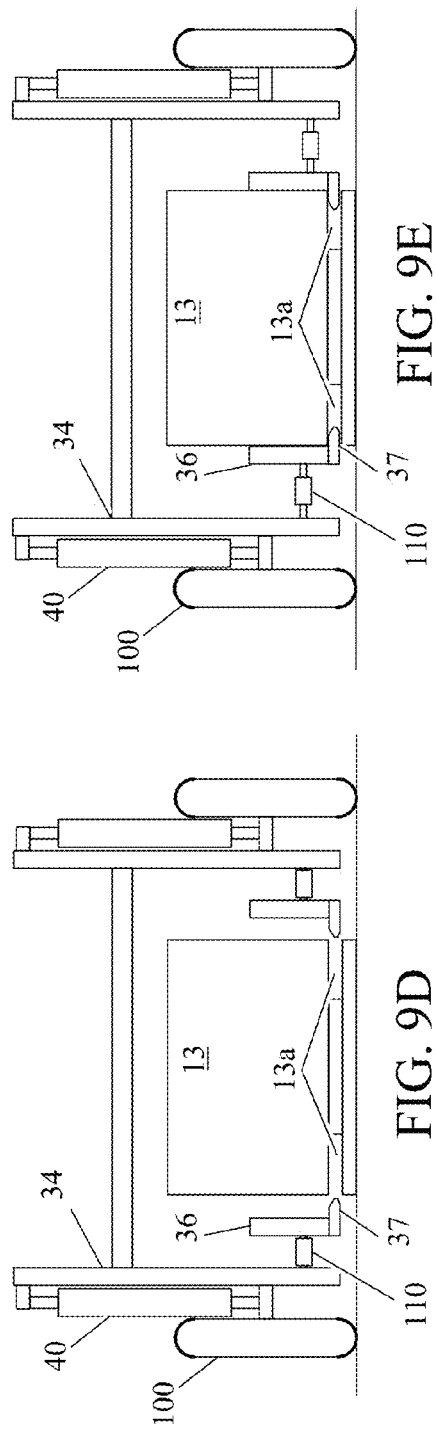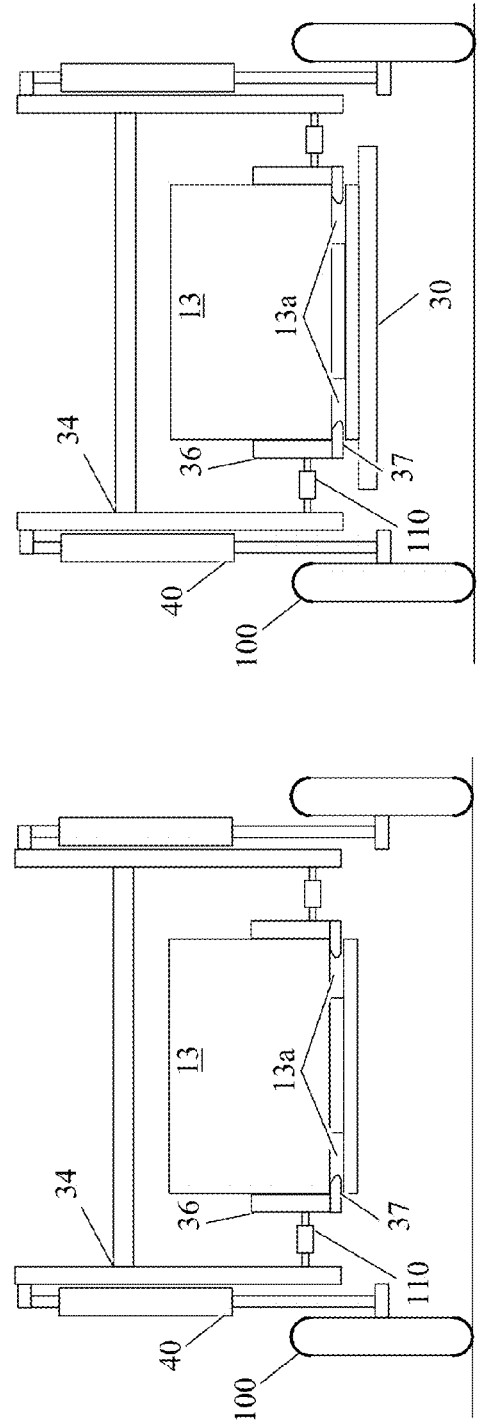

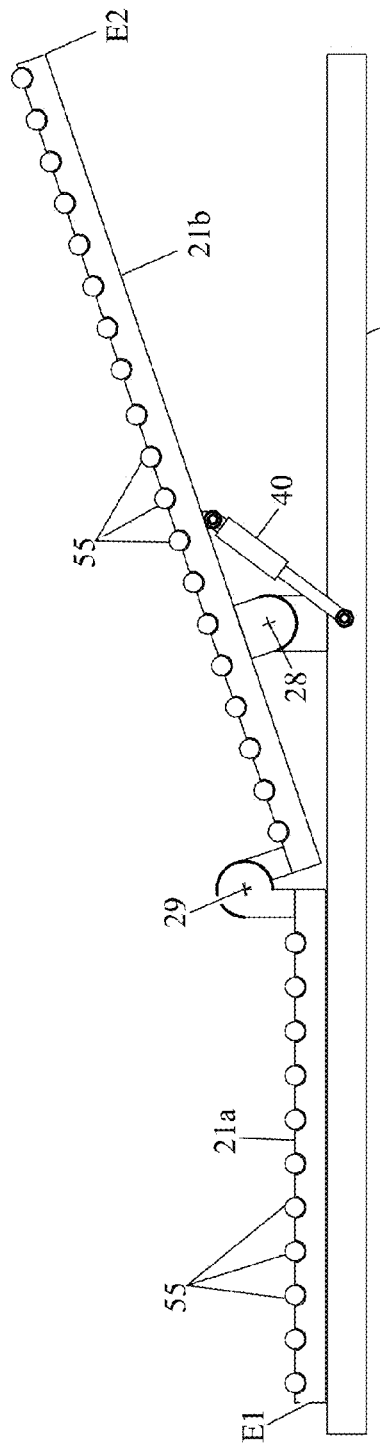
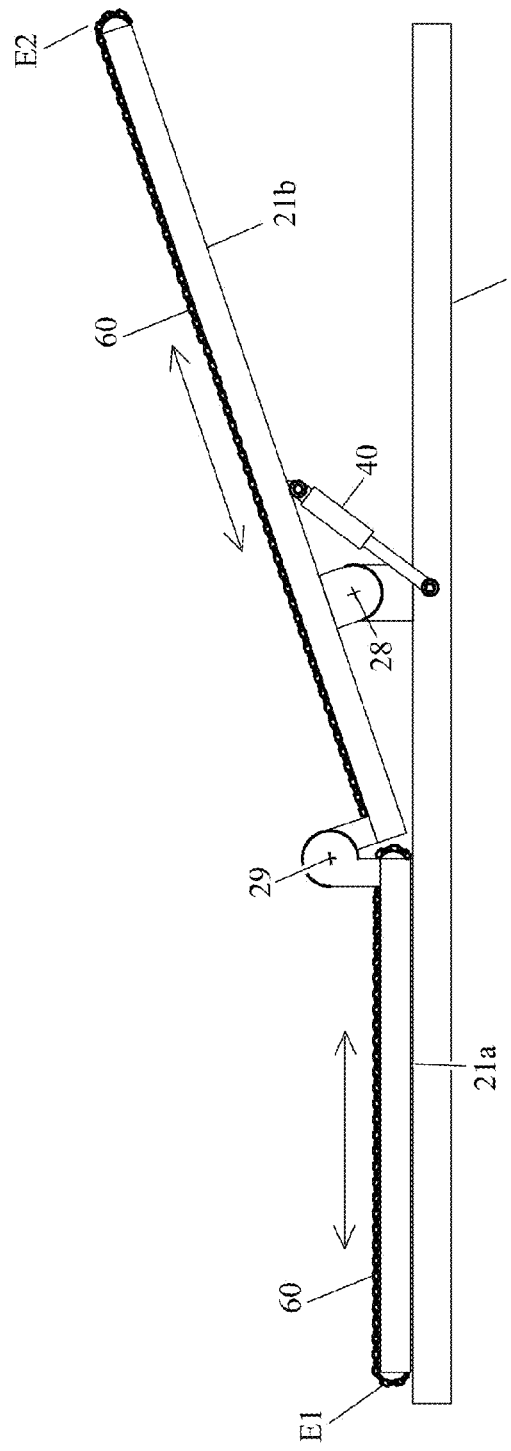
FIG. 16
FIG. 17

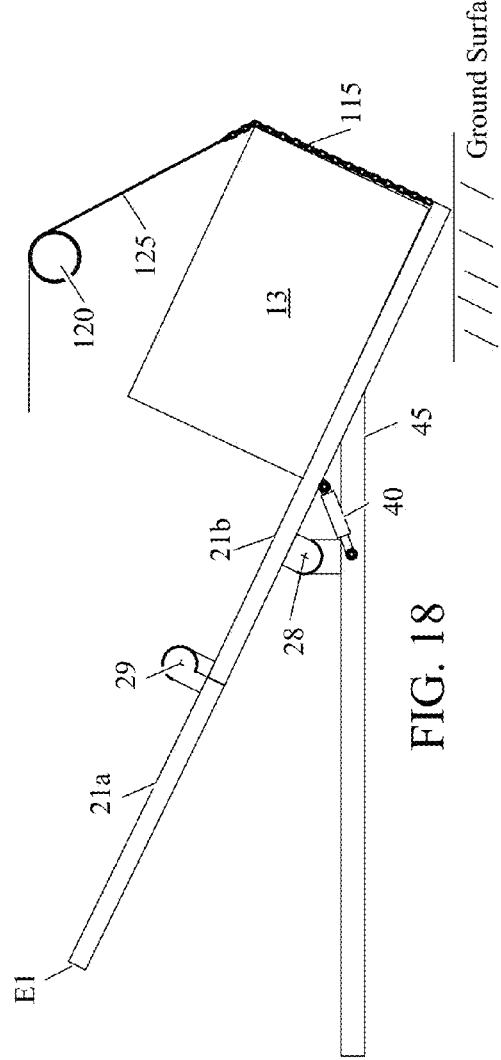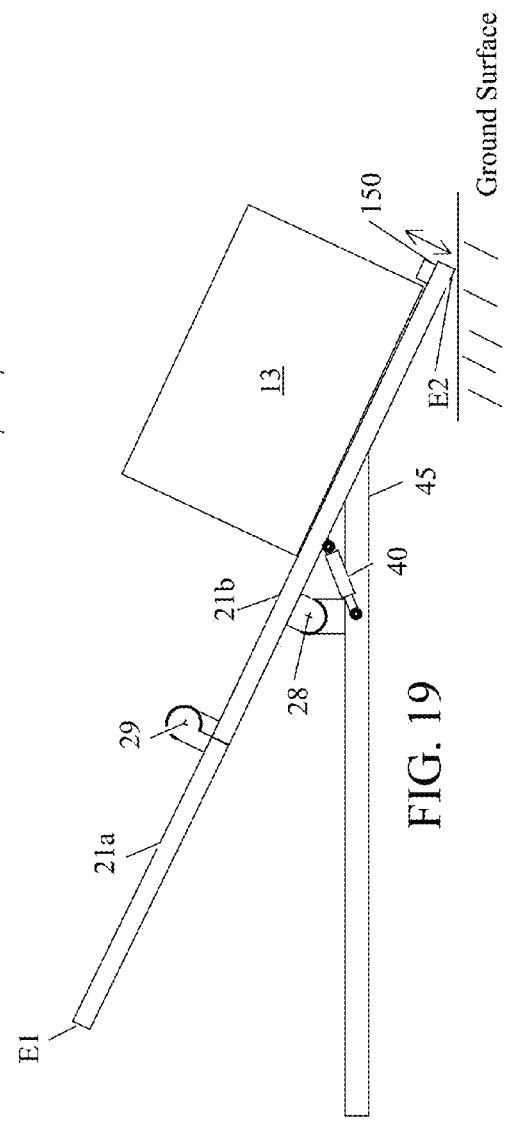

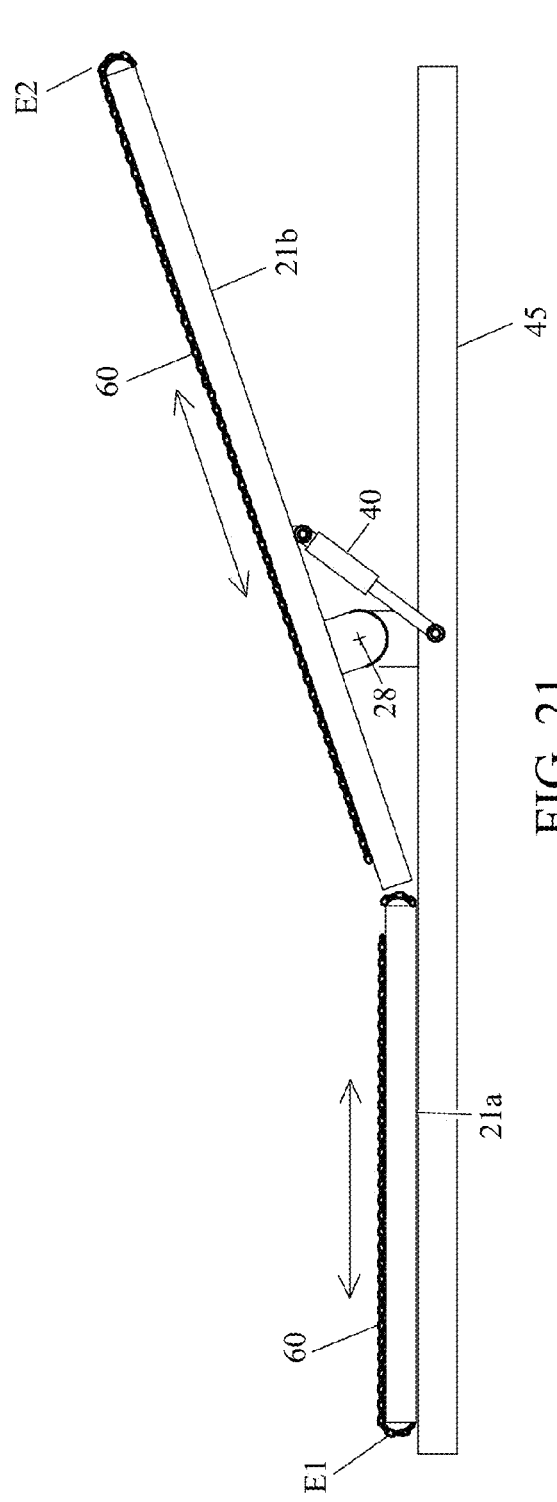
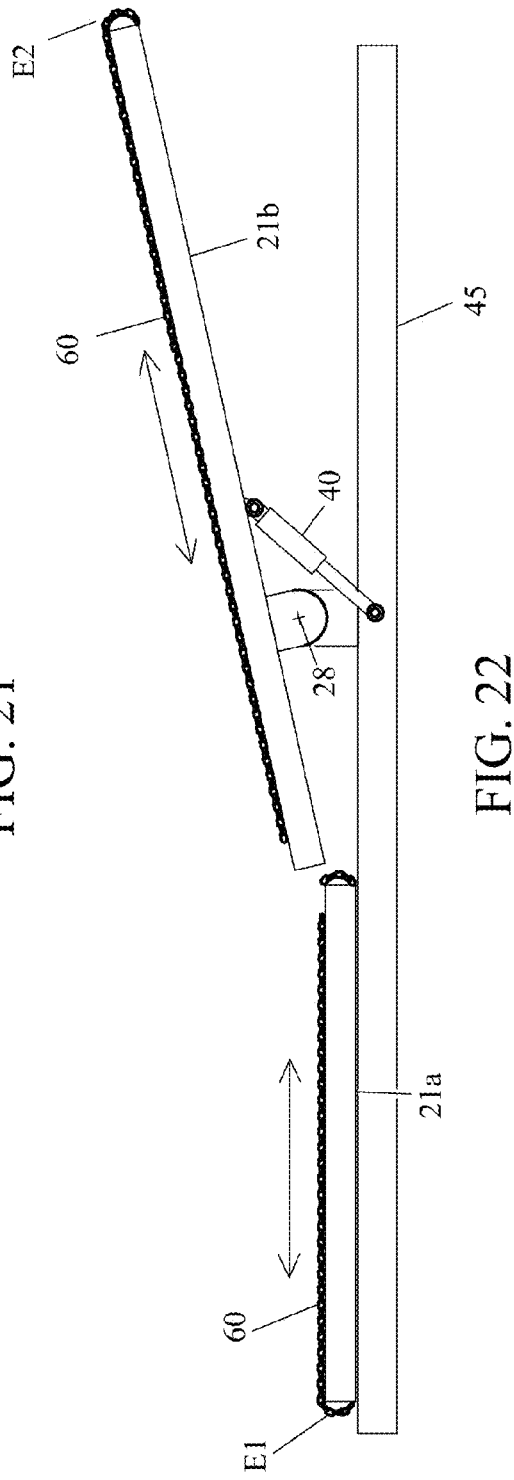
FIG. 21
FIG. 22

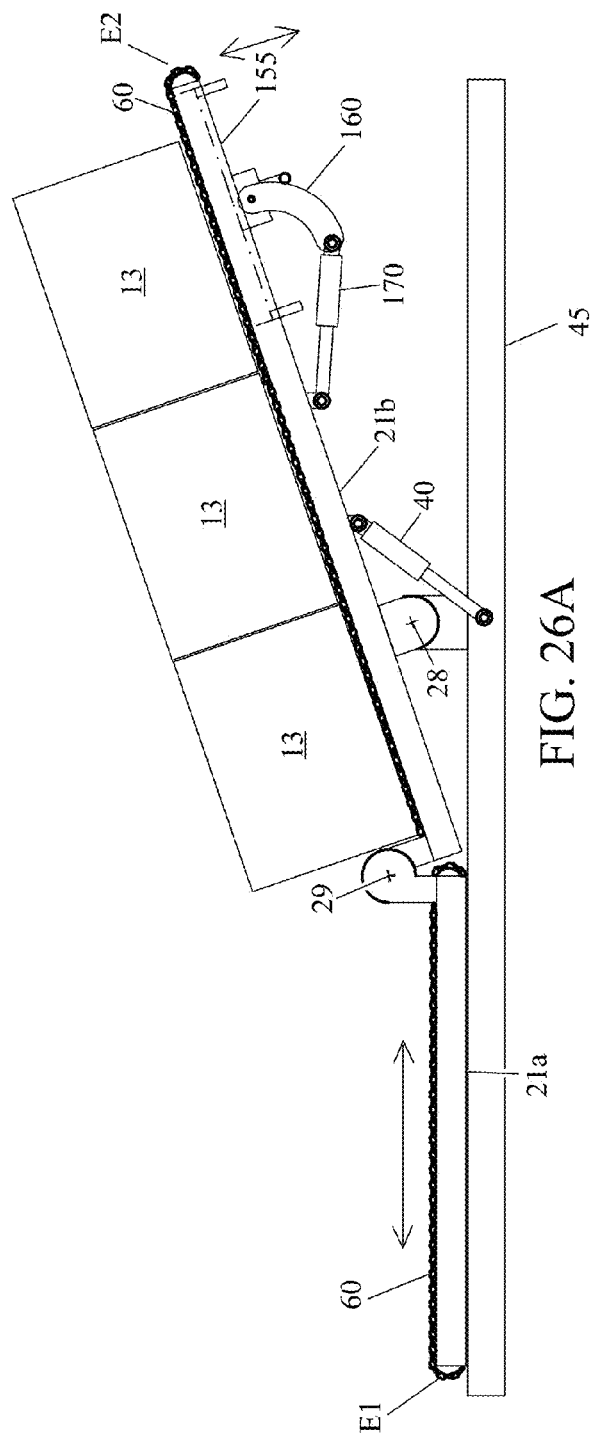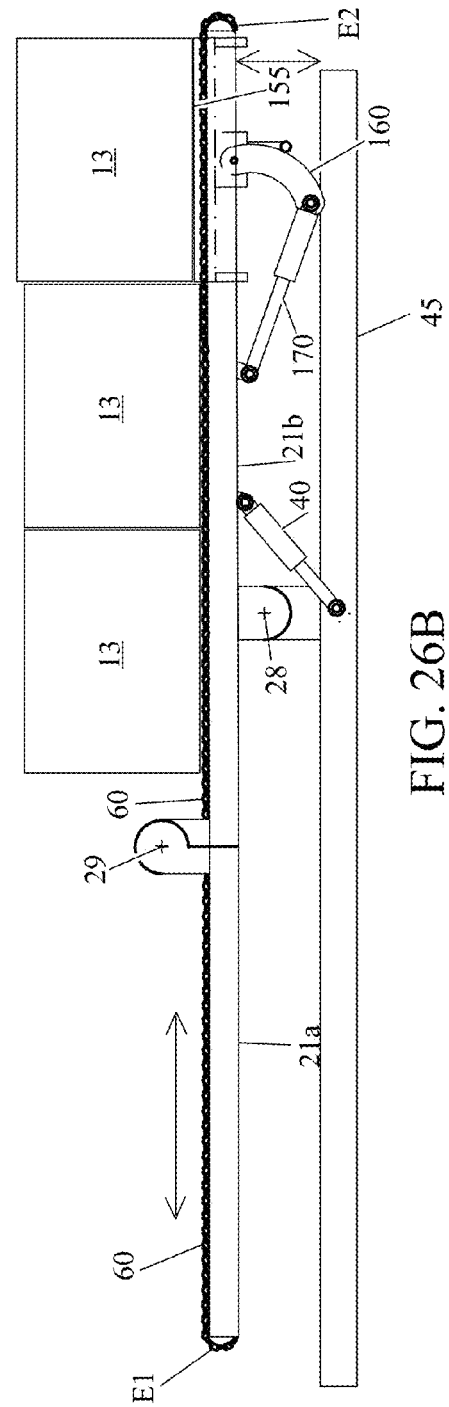
FIG. 26A
FIG. 26B

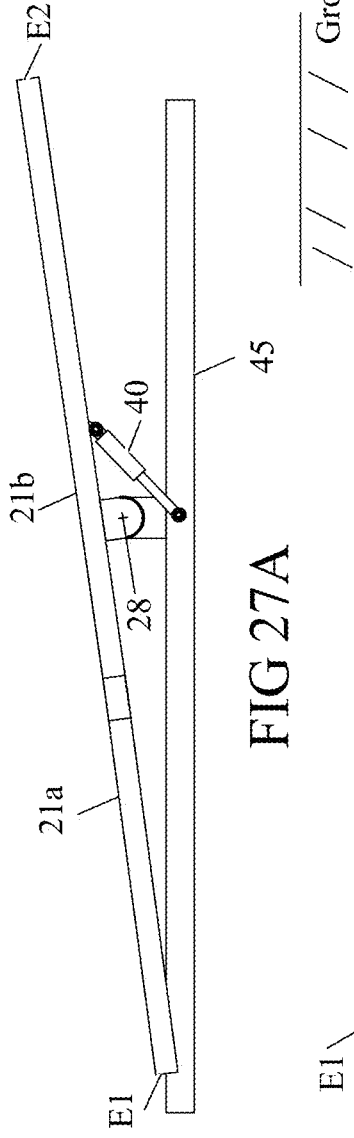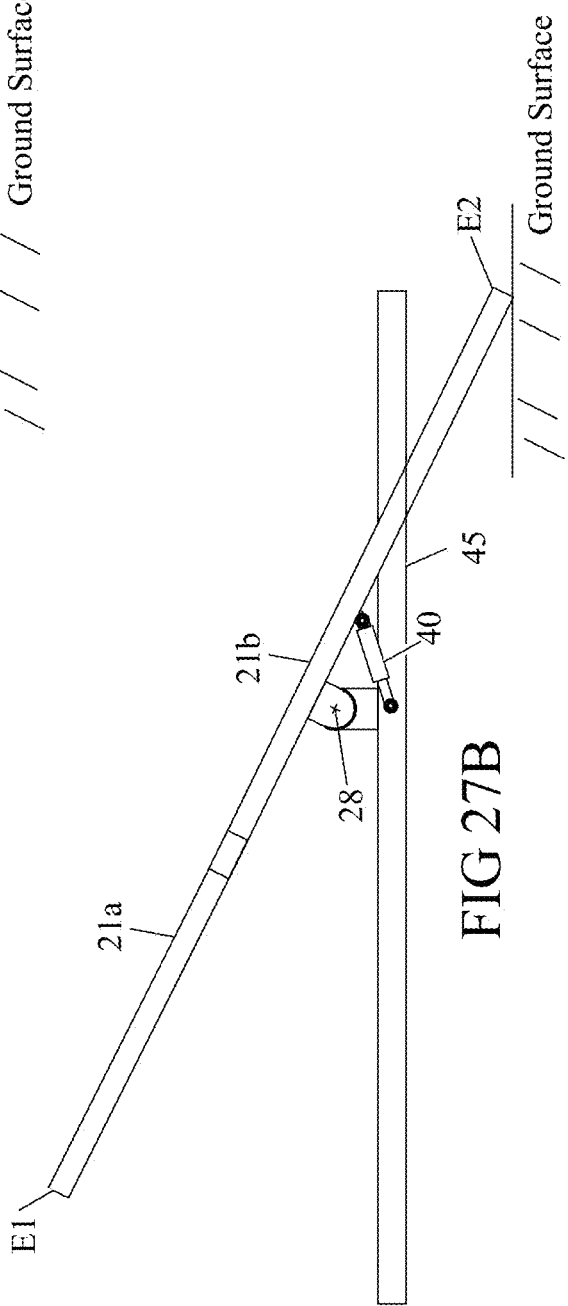
FIG 27A
FIG 27B

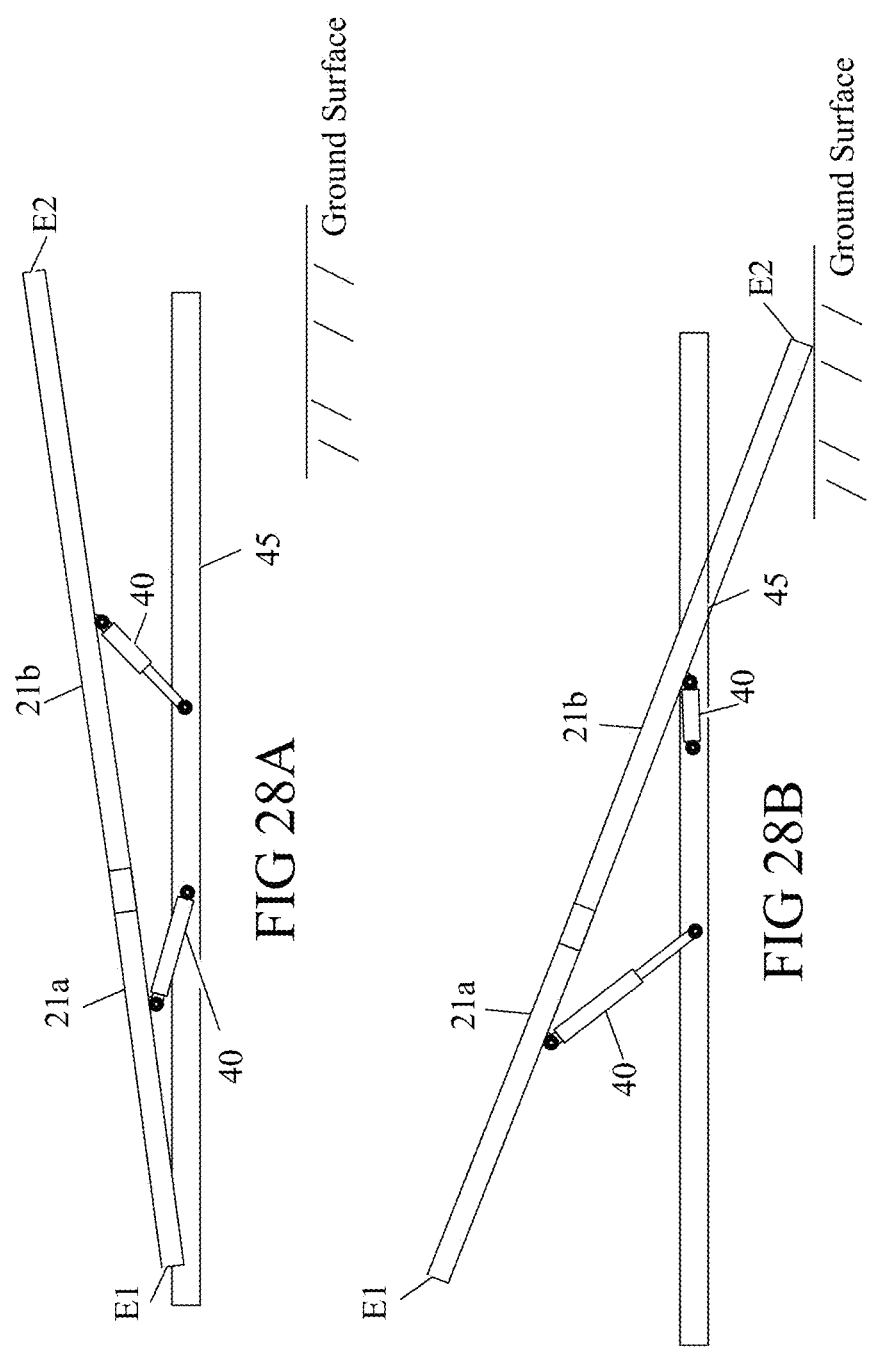

FRUIT HARVESTER PLATFORM

REFERENCE TO RELATED APPLICATIONS

This application claims one or more inventions which were disclosed in Provisional Application No. 61/920,079, filed Dec. 23, 2013, entitled "Fruit Harvester Platform". The benefit under 35 USC §119(e) of the United States provisional application is hereby claimed, and the aforementioned application is hereby incorporated herein by reference.

BACKGROUND OF THE INVENTION

Field of the Invention

The invention pertains to the field of methods and apparatus for harvesting crops.

Description of Related Art

A typical field arrangement of agricultural products in a field, for example fruit trees, and a prior art harvesting method are shown in prior art FIG. 1. Fruit trees 10 are typically grown in organized orchards and further organized in rows 11 with an access lane 11a between them. Typically, the rows 11 are spaced a distance $W_R$ between six and twenty-five feet apart, with a fruit tree spacing $D_T$ of one to twenty feet between adjacent fruit trees 10 within a row 11. Fruit trees 10 typically range from six to twenty feet in height, depending on the variety and configuration of the fruit trees 10.

Generally, harvesting fruit such as apples requires a picker 12 to walk between the rows 11 and carry a ladder from fruit tree 10 to fruit tree 10, and climb up and down the ladder in order to harvest the fruit. Typically, the picker 12 will pick the fruit and put it in a basket or harvesting bag, often worn on a harness or strap, allowing the picker 12 to carry a large volume fruit while scaling the ladder.

Once the bag is full, the picker 12 walks with the picking bag to a location where a storage box 13 or storage boxes 13 are positioned, possibly in another access lane 11a, and empty fruit from the basket or harvesting bag into a storage box 13 and repeat the process. For example, picked apples are typically placed in large storage boxes 13 having dimensions of approximately 48 l×42 w×27 h (inches).

As the picker 12 moves along a row 11 harvesting fruit, a second person must move the partly full storage box 13 along the row with a tractor 14, forklift, or other carriage, so that the storage box 13 is closer to the picker 12, and walking distance between the fruit tree 10 the picker 12 is harvesting and the storage box 13 is minimized. The storage box 13 may be moved up to five times or more, depending on the fruit load on the fruit trees 10, and the picker's 12 location relative to the location of the storage boxes 13 in the access lane 11a. It will be apparent to the reader that this harvesting process is iterative and largely manual, and therefore may be very labor intensive and time consuming, particularly in large orchards.

The person moving the storage boxes 13 as they are filled must also supply empty storage boxes 13, and remove full storage boxes 13 as needed so the harvesting operation may proceed in a continuous manner. Moving the storage boxes 13 is also very labor intensive and involves many additional steps, all of which may potentially damage the fruit when full storage boxes 13 bounce around during transport, particularly over uneven agricultural landscapes.

If fruit trees 10 have fruit above the easy reach of the picker 12, a ladder is required for the picker 12 to reach the fruit. While the picker 12 is harvesting fruit, there is significant time consumed climbing the ladder, carrying the ladder, and walking from trees 10 to storage boxes 13 to empty full picking bags into the storage boxes 13. Walking through potentially wet and muddy terrain while carrying the ladder and picking bags also poses a potential hazard to pickers 12, as a picker 12 carrying a heavy load in such conditions may slip and fall. Additionally, stabilizing a ladder on soft or wet ground may be difficult, and climbing the ladder with muddy feet poses a danger of falling from the ladder, particularly when a picker 12 must reach far from the ladder while harvesting fruit. The potential to slip and fall is increased late in the work day when pickers 12 may become tired and concentrate less on safety. The entire harvesting operation is thus extremely labor intensive and physically exhausting for the people harvesting the fruit, and poses significant risks and liability to workers and orchard owners alike.

Filling storage boxes 13 may be complicated by spot picking, wherein rows 11 of fruit trees 10 are picked multiple times, with only ripe fruit being harvested from each fruit tree 10 during each picking.

To improve the efficiency of the harvest operation, specifically in moving the storage boxes 13, various strategies have been employed.

The traditional strategy for organizing storage boxes 13 is to pick storage boxes 13 up one at a time, and move individual storage boxes 13 along the access lane 11a with a tractor 14 equipped with fork sets at one end, or both ends, of the tractor.

Prior art FIG. 2 illustrates a harvesting operation in which a multiple storage box 13 movement strategy is implemented. The multiple storage box 13 movement strategy entails moving multiple storage boxes 13 in groups, typically transported with a self-loading trailer 16. In this strategy, single or multiple storage boxes 13 on the self-loading trailer 16 may be continuously moved using a tractor 14, or other prime mover.

Alternatively, the storage boxes 13 may be placed on self-propelled carts that move through the orchard, reducing the pickers 12 need to walk to fill the storage boxes 13. It is also possible for the storage boxes 13 to be slid along on the ground on a sled pulled or pushed by a tractor 14 or other prime mover.

To reduce reliance on ladders, picking platforms have been developed to provide access to the fruit above the typical height that a picker 12 can reach. These individual platforms are typically height adjustable, and may be moved perpendicular to the direction of the row 11 to accommodate trees 10 of varying heights, and rows 11 with varying spacing $W_R$.

These methods work, but issues related to storage box 13 management still persist. Typically, it is not possible to move full storage boxes 13 around other empty or partially full storage boxes 13 in the access lane 11a because the row spacing $W_R$ is too narrow for two boxes to exist side by side in the access lane 11a without damaging either the tree 10 or the fruit on the tree 10. Therefore, when storage boxes 13 are full, the full storage boxes 13 have to be transported individually, or in groups, to the end of the access lane 11a, for later collection and transport to a warehouse or staging area.

Various solutions to this problem exist, such as having multiple empty storage boxes 13 pre-positioned in the access lane 11a. A self-loading trailer 16 then loads an empty storage box 13 from the access lane 11a, carries the storage box 13 while trees 10 are being picked, and then unloads the full storage box 13 into the access lane 11a. This strategy has two key drawbacks:

The first drawback is that the pre-positioning spacing between successive storage boxes 13 in the access lane 11a is critical. If the empty storage boxes 13 are spaced too close to each other, the self-loading trailer 16 may arrive at an empty storage box 13 before the storage boxes 13 on the self-loading trailer 16 are completely full. If the storage boxes 13 are spaced too far apart from each other, the storage boxes 13 on the self-loading trailer 16 become filled before an empty storage box 13 is available for pick up.

The second drawback of pre-positioning empty storage boxes 13 and unloading full storage boxes 13 from the self-loading trailer 16 is that pre-positioning the empty storage boxes 13 in the access lane 11a and retrieving the full storage boxes 13 from the access lane 11a is time consuming and may leave fruit in the full storage boxes 13 vulnerable to field heat, excessive moisture, insect damage, birds, rodents, or other undesirable environmental factors.

Other strategies include moving a trailer 16 with multiple storage boxes 13 along with the pickers 12 as the pickers 12 harvest fruit from trees 10 in a row 11. Once all the storage boxes 13 on the trailer 16 are full, the trailer 16 is driven to the end of the access lane 11a, reloaded with empty storage boxes 13 after removing the full storage boxes 13, and returned to where the pickers 12 are working. Alternatively, a second trailer 16 may be brought into the access lane 11a with another load of empty storage boxes 13 while the first trailer 16 is being emptied and reloaded. This strategy requires the pickers 12 to wait for storage boxes 13 while the trailer 16 is being reloaded. Alternatively, using two trailers 16 increases equipment costs and manpower requirements, and may also incur delays between the departure of a full trailer 16 from the picking area and the arrival of a second trailer 16 to the picking area.

None of these strategies effectively optimizes harvesting operations of agricultural products, or optimizes management of empty and full storage boxes in the field during harvesting.

SUMMARY OF THE INVENTION

The mobile picking platform system and method described herein provides a continuous movement harvest system for use in harvesting of agricultural products, for example in the fruit industry. The main objectives of this mobile picking platform system are to minimize the need for shuttling storage boxes in and out of access lanes to reduce handling, reduce walking through access lanes to empty picking bags, and to save lost time and reduce danger associated with climbing ladders in a muddy and often wet environment.

A mobile picking platform includes a mobile carriage with a superstructure supporting multiple adjustable picking stations. A storage box carrier on the mobile picking platform has a pick position in which empty storage boxes are held at optimum heights for pickers to reach from the multiple picking stations at multiple heights above the ground. The storage box carrier has an unload position in which full storage boxes may be unloaded onto a ground surface. The storage box carrier also has a load position for receiving empty storage boxes from a storage unit or a shuttle trailer.

In one embodiment, a storage unit is trailed behind the mobile picking platform and carries a set of empty storage boxes. The storage unit includes a mobile carriage with a bed having an up position in which the bed will pass over full storage boxes unloaded to a ground surface from the mobile picking platform. An up position also facilitates transfer of empty storage boxes to the mobile picking platform after full boxes have been unloaded from the mobile picking platform. The bed of the storage unit also has a down position in which empty storage boxes may be loaded on to the bed of the storage unit from a shuttle trailer.

A shuttle trailer may also be included in the system to transfer empty storage boxes from a storage box depot to the mobile picking platform and storage unit. The shuttle trailer has a down position in which full storage boxes may be picked up from a ground surface for transport to a warehouse or processing facility. The shuttle trailer also has an up position that facilitates transfer of empty storage boxes to the storage unit, or alternatively, directly to the mobile picking platform. In some embodiments, an up position of the shuttle trailer allows full storage boxes on a ground surface to pass under the shuttle trailer.

BRIEF DESCRIPTION OF THE DRAWINGS

FIG. 9D shows a shuttle trailer with lifting arms and retractable forks in a down and empty position preparing to pick up a storage box.

FIG. 9E shows a shuttle trailer with lifting arms and retractable forks in a down and carry position preparing to pick up a storage box.

FIG. 9F shows a shuttle trailer with lifting arms and retractable forks in an up and carry position after picking up a storage box.

FIG. 9G shows a shuttle trailer with lifting arms and retractable forks in an up and carry position transferring a storage box to the bed of a storage unit.

FIG. 16 shows the storage box carrier of a mobile picking platform with conveyor rollers.

FIG. 17 shows the storage box carrier of a mobile picking platform with a chain conveyor.

FIG. 18 shows the storage box carrier of a mobile picking platform with chain and rope storage box restraint.

FIG. 19 shows the storage box carrier of a mobile picking platform with a retractable storage box stop.

FIG. 21 shows a hingeless storage box carrier of a mobile picking platform with a chain conveyor in a pick position.

FIG. 22 shows a hingeless storage box carrier of a mobile picking platform with a chain conveyor in a load position.

FIG. 26A shows the storage box carrier of a mobile picking platform with a vertical brake in a down position.

FIG. 26B shows the storage box carrier of a mobile picking platform with a vertical brake in an up position.

FIG. 27A shows a unitary storage box carrier with a pivot in a pick position.

FIG. 27B shows a unitary storage box carrier with a pivot in an unload position.

FIG. 28A shows a unitary storage box carrier with two lifting mechanisms in a pick position.

FIG. 28B shows a unitary storage box carrier with two lifting mechanisms in an unload position.

DETAILED DESCRIPTION OF THE INVENTION

A fruit harvester mobile picking platform system as described herein provides for efficient harvesting of fruit and other agricultural products, as well as efficient management of storage boxes 13 used to collect fruit and other agricultural products during harvesting and transport the harvest from the orchard or field after harvesting.

Figure 1:
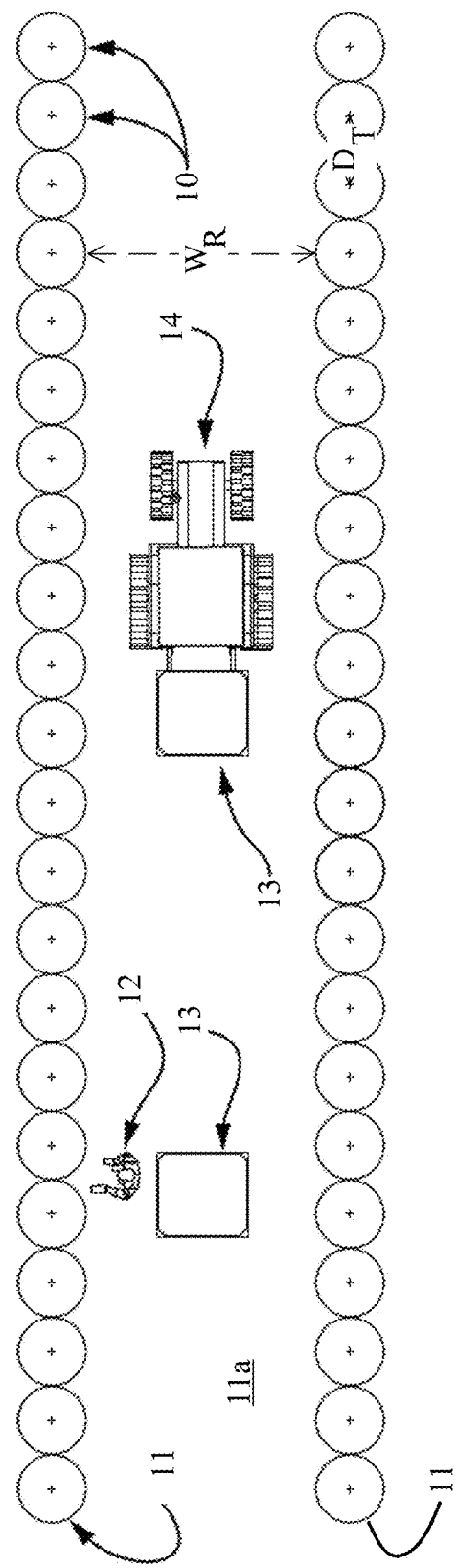
FIG. 1 shows a prior art picking operation and orchard layout.
Figure 2:
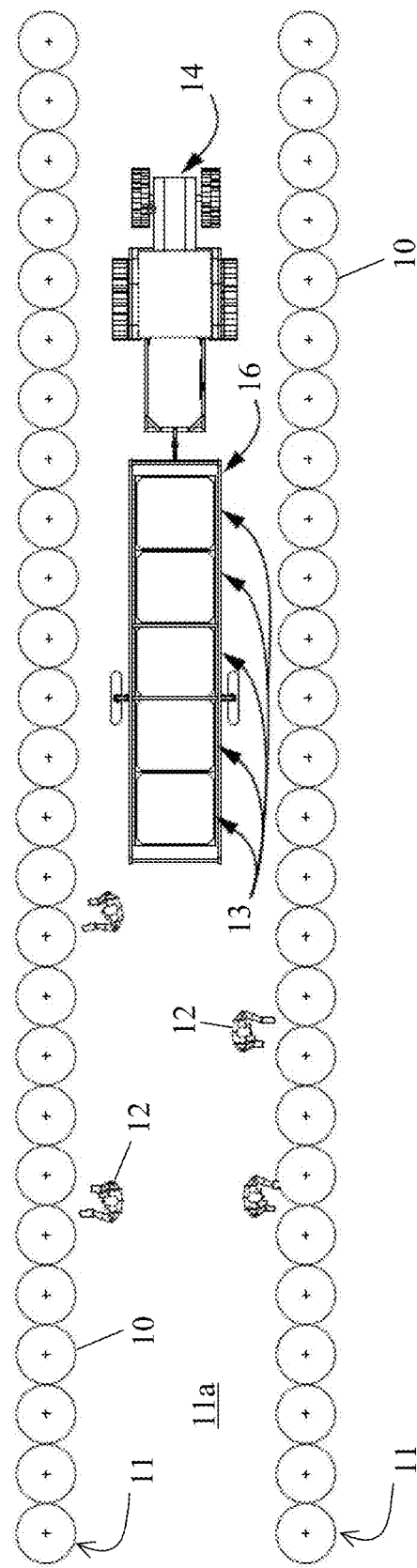
FIG. 2 shows a prior art picking operation and orchard layout using multiple storage boxes.
Figure 3:
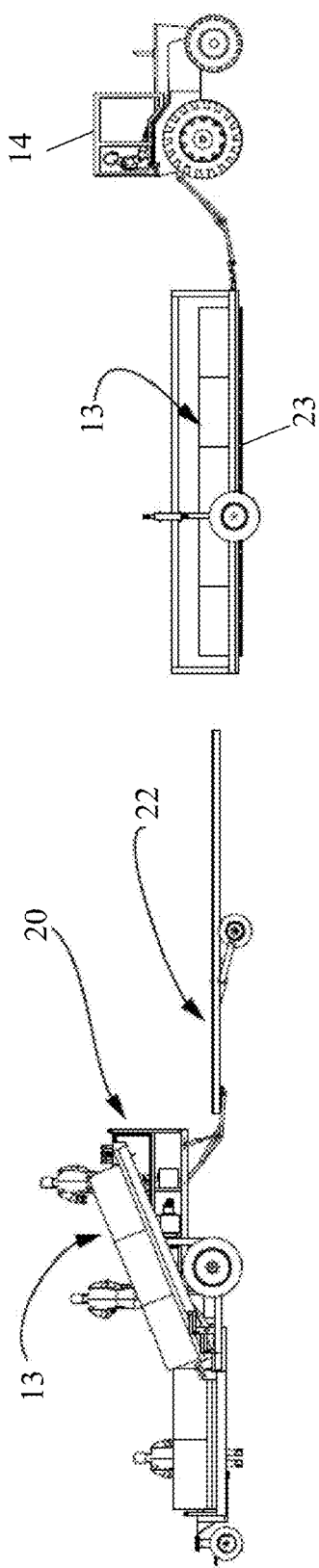
FIG. 3 shows a mobile picking platform, storage unit, and shuttle trailer of a mobile picking platform system.

FIG. 3 illustrates the elements of the mobile picking platform system described herein. The mobile picking platform system includes: a mobile picking platform 20 that has multiple picking stations and carries multiple storage boxes 13 at multiple levels; a storage unit 22 carrying multiple storage boxes 13; and a shuttle trailer 23 that moves storage boxes 13 in and out of the access lane 11a as needed.

Figure 4:
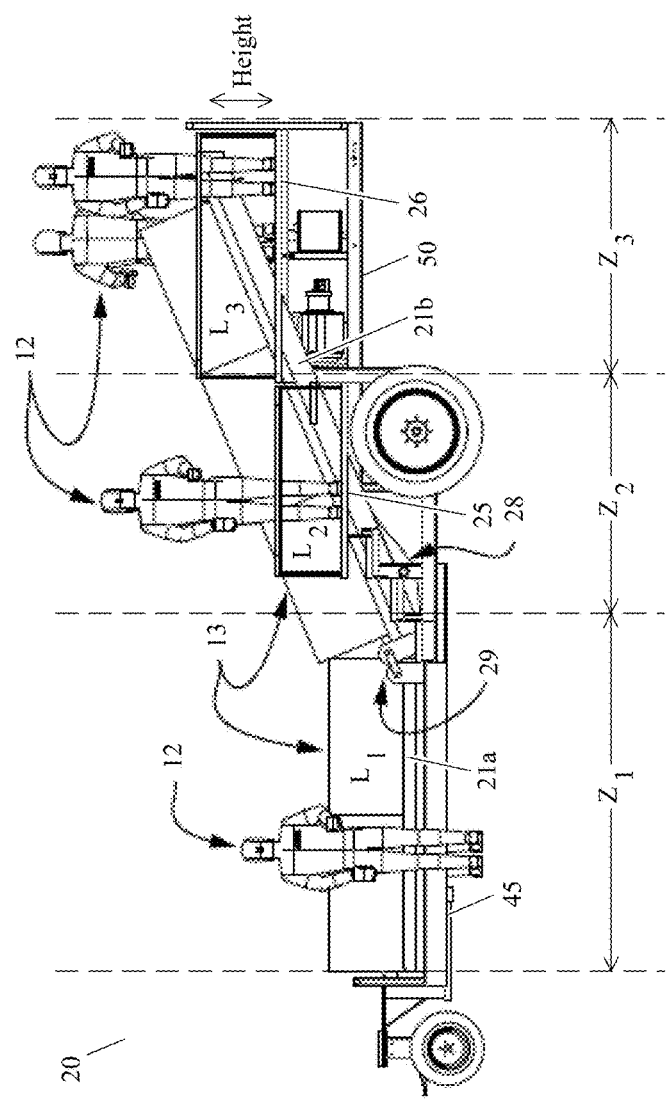
FIG. 4 shows a mobile picking platform having multiple picking positions at multiple heights above a ground surface.

As shown in FIG. 4, the mobile picking platform 20 includes a mobile carriage 45 and a superstructure 50 with two picking stations and multiple fixed picking zones $Z_n$. In one embodiment, three picking zones $Z_1$, $Z_2$, $Z_3$ are generally defined and include a low zone $Z_1$ filled by pickers 12 working from the ground, a middle zone $Z_2$ filled by pickers 12 at a picking station at a first height above the ground on middle zone platforms 25, and an upper zone $Z_3$ filled by pickers 12 at picking stations at a second height above the ground on upper zone platforms 26. While three picking zones $Z_1$, $Z_2$, $Z_3$ are shown in this figure, it will be understood that fewer or greater numbers of picking zones 4 may be defined as necessary to optimize the mobile picking platform 20 to trees of various heights, and to optimize the rate at which fruit may be harvested.

Figure 15:
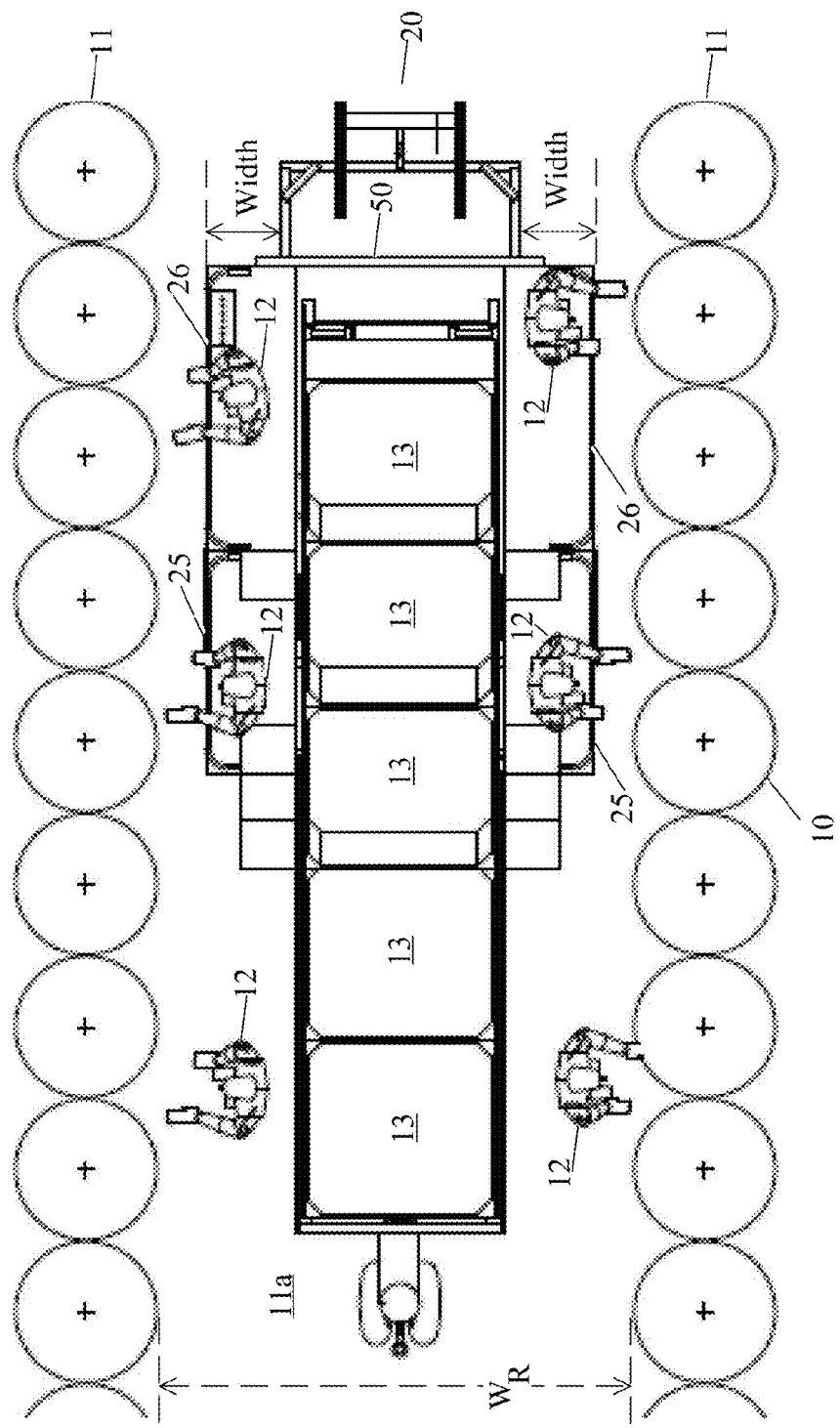
FIG. 15 shows a mobile picking platform with adjustable picking stations.

As indicated by solid double ended arrows in FIG. 15, the width of the mobile picking platform 20 is a function of the orchard or field configuration being harvested and the width $W_R$ between rows 11 of agricultural products. The mobile picking platform 20 may be adjustable in width to accommodate various row 11 and tree 10 configurations. For example, middle zone platforms 25 and upper zone platforms 26 may be mounted on adjustable rails from both row-facing sides of the superstructure 50 of the mobile picking platform 20. Thus, middle zone platforms 25 and the upper zone platforms 26 may be adjusted to accommodate a given row width $W_R$, with pickers 12 harvesting fruit from trees 10 on each side of the access lane 11a while the mobile picking platform 20 is moved along a center of the access lane 11a. Similarly, as indicated by solid double ended arrows in FIG. 4, the middle zone platforms 25 and upper zone platforms 26 may also be adjustable in height to accommodate different heights of trees 10 or other agricultural products.

Figure 12:
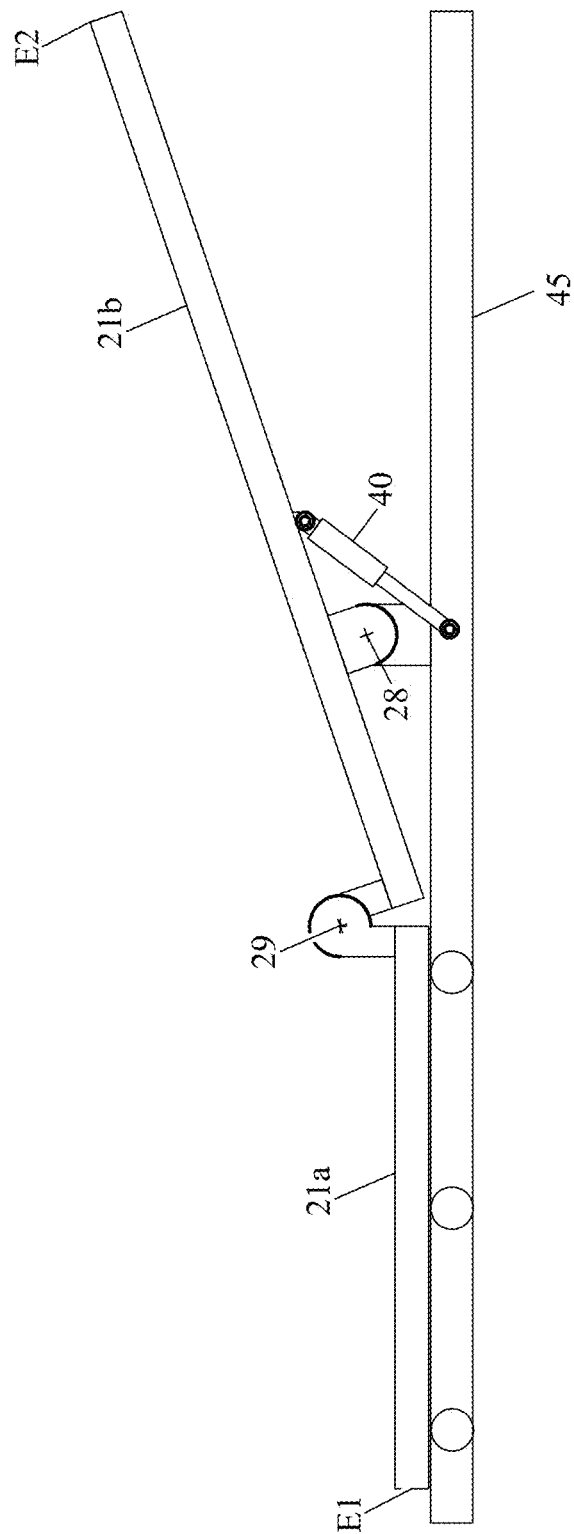
FIG. 12 shows the storage box carrier of a mobile picking platform in a pick position.

Referring to FIG. 4 and FIG. 12, multiple storage box 13 levels $L_1$, $L_2$, $L_3$ are created, in one embodiment, by incorporating a hinge 29 into a storage box carrier 21 on the mobile carriage 45 of the mobile picking platform 20 at a location along a length of the storage box carrier 21, separating the storage box carrier 21 into a first carrier section 21a and a second carrier section 21b. Thus, the second carrier section 21b may be elevated or pivoted upward to provide access to storage boxes 13 at the middle zone platforms 25 and the upper zone platforms 26.

In a typical five storage box configuration, three storage boxes 13 are positioned on the second carrier section 21b. However, any number of storage boxes 13 may be positioned for access at each picking zone $Z_1$, $Z_2$, $Z_3$, depending on the size of each storage box 13, the number of picking zones $Z_n$, the length of the mobile picking platform 20, and other factors, in order to optimize operation of the mobile picking platform 20 to various orchard and field conditions.

A pivot 28 is provided under the second carrier section 21b, and a lifting mechanism 40, such as a set of hydraulic cylinders, may be used to rotate the second carrier section 21b about the pivot 28. This configuration provides space for lifting mechanism 40 and pivot 28 without increasing a height of the first carrier section 21a above a ground level. Positioning storage boxes 13 on an incline has an added advantage of discouraging fruit from rolling around in the bottom of a storage box 13 and minimizing fruit handling damage during the movement of the mobile picking platform 20 along an access lane 11a.

The first carrier section 21a and second carrier section 21b, in some embodiments, may include a storage box drive unit in the form of conveyor rollers 55, shown in FIG. 16, and together with the hinge 29 and pivot 28, allow the first carrier section 21a and second carrier section 21b to be inclined and articulated to facilitate loading empty boxes, unloading full boxes, and positioning storage boxes 13 at the correct height for the picker 12 to easily place picked agricultural products in the storage boxes 13.

Figure 5:
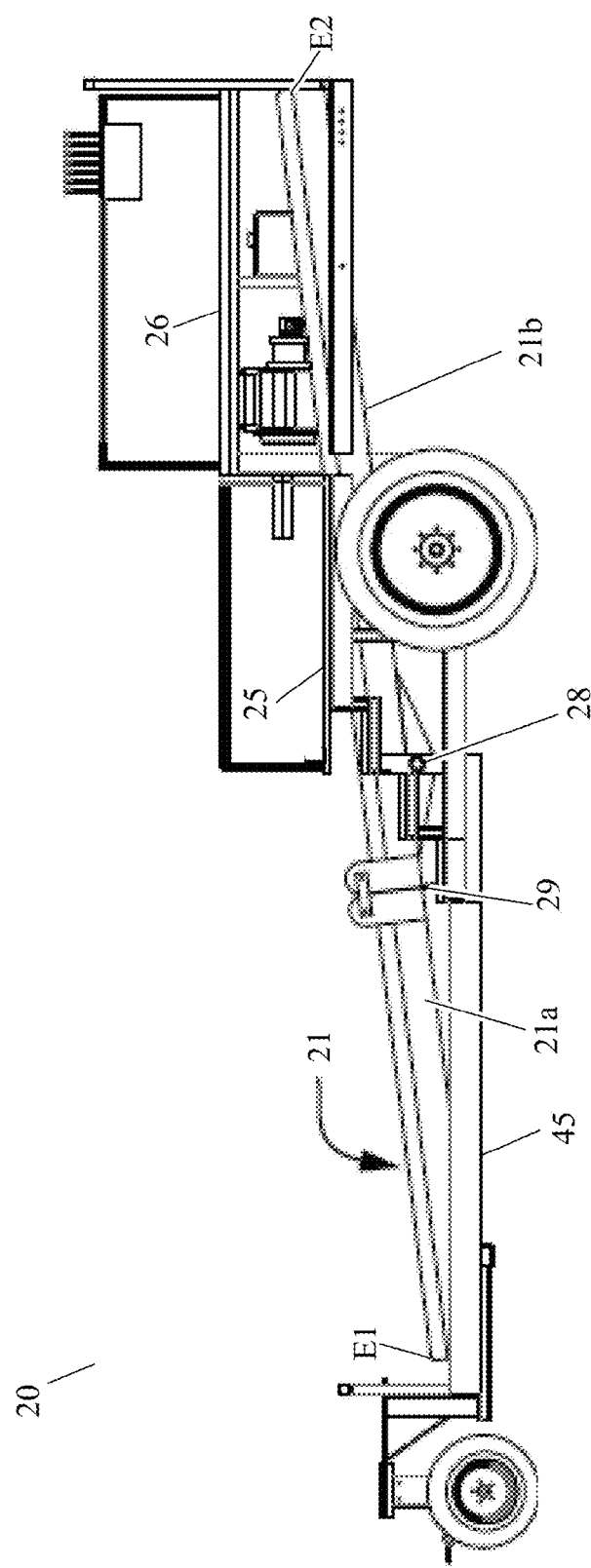
FIG. 5 shows a mobile picking platform having a storage box carrier in a load position.
Figure 13:
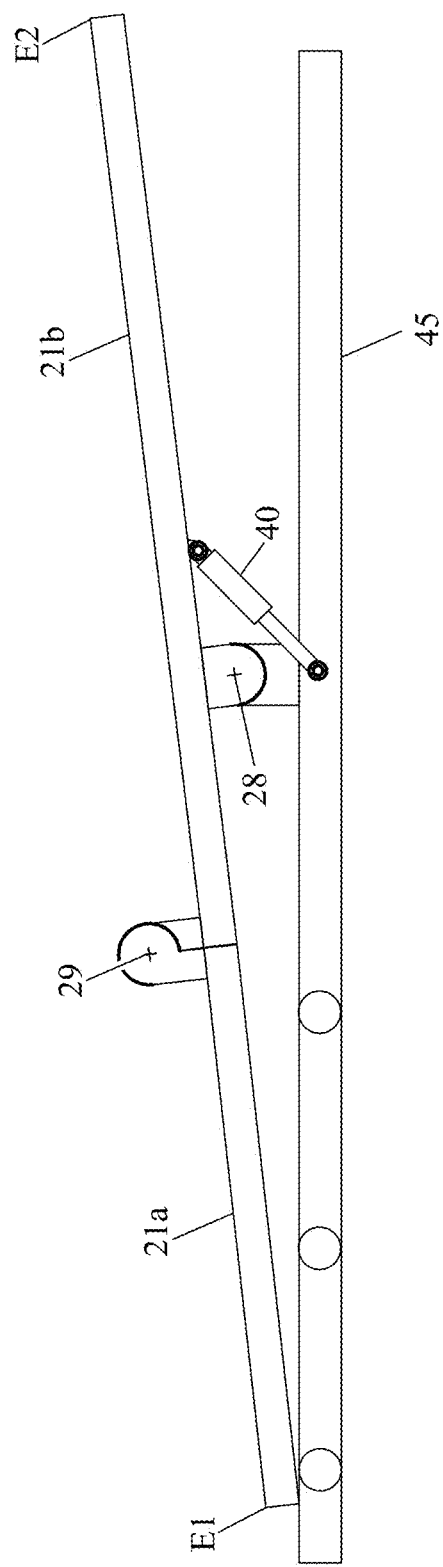
FIG. 13 shows the storage box carrier of a mobile picking platform in a load position.

A lifting mechanism 40 is attached to the second carrier section 21b and moves the storage box carrier 21 between a load position, an unload position, and a pick position. As shown in FIG. 5 and FIG. 13, in the load position the storage box carrier 21 in a straight orientation, with the first carrier section 21a and second carrier section 21b in alignment. A first end E1 of the storage box carrier 21 is lower than a second end E2 of the storage box carrier 21, so that the storage box carrier 21 is angled downward toward the first end E1 of the storage box carrier and an end of the mobile picking platform 20.

In this position, the second end E2 of the storage box carrier 21 is elevated to the same level of the storage unit 22 when the storage unit 22 is in an up position. As the storage box carrier 21 is provided with a storage box drive unit in the form of conveyor rollers 55 on an upper surface of the storage box carrier 21, and since the storage box carrier 21 is oriented at downward sloping angle, storage boxes 13 may slide down the storage carrier 21 from the second end E2 to the first end E1 to fill the mobile picking platform 20 as storage boxes 13 are transferred from the storage unit 22 to the storage box carrier 21 via a chain driven transport on the storage unit 22.

Figure 6:
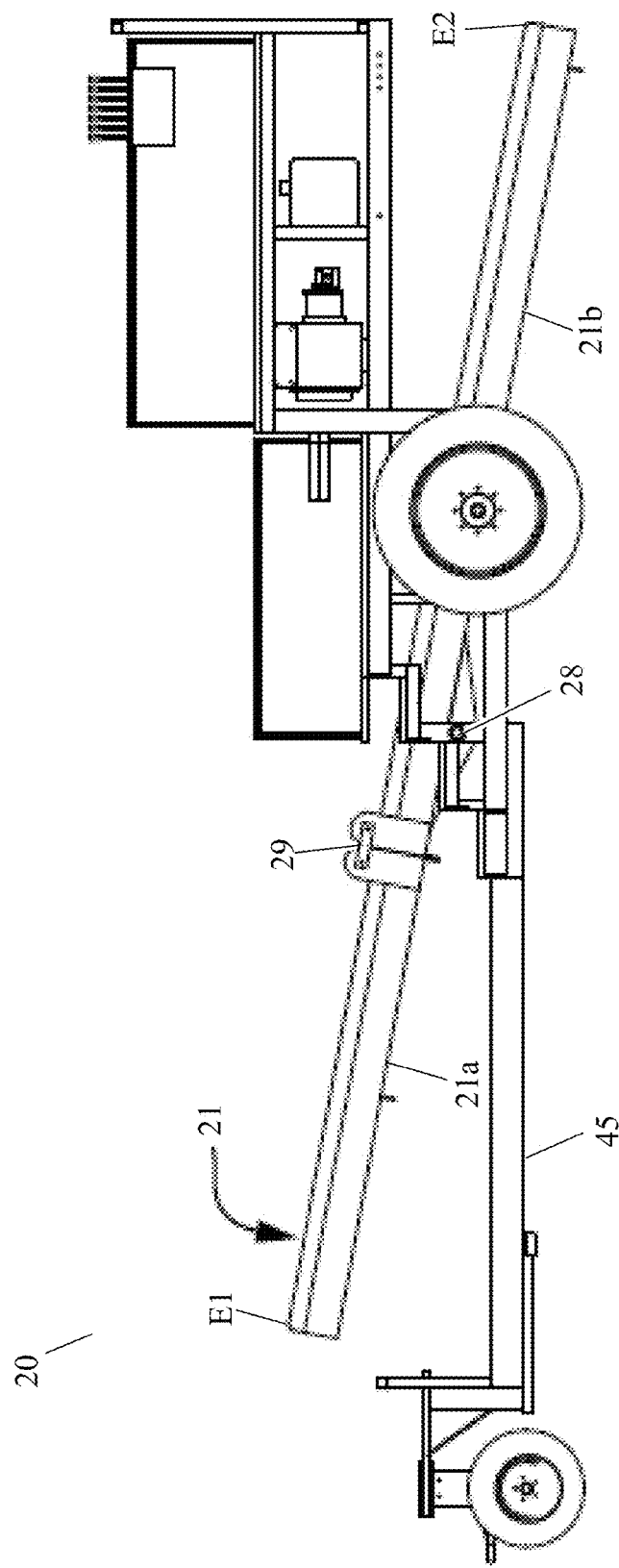
FIG. 6 shows a mobile picking platform having a storage box carrier in an unload position.
Figure 14:
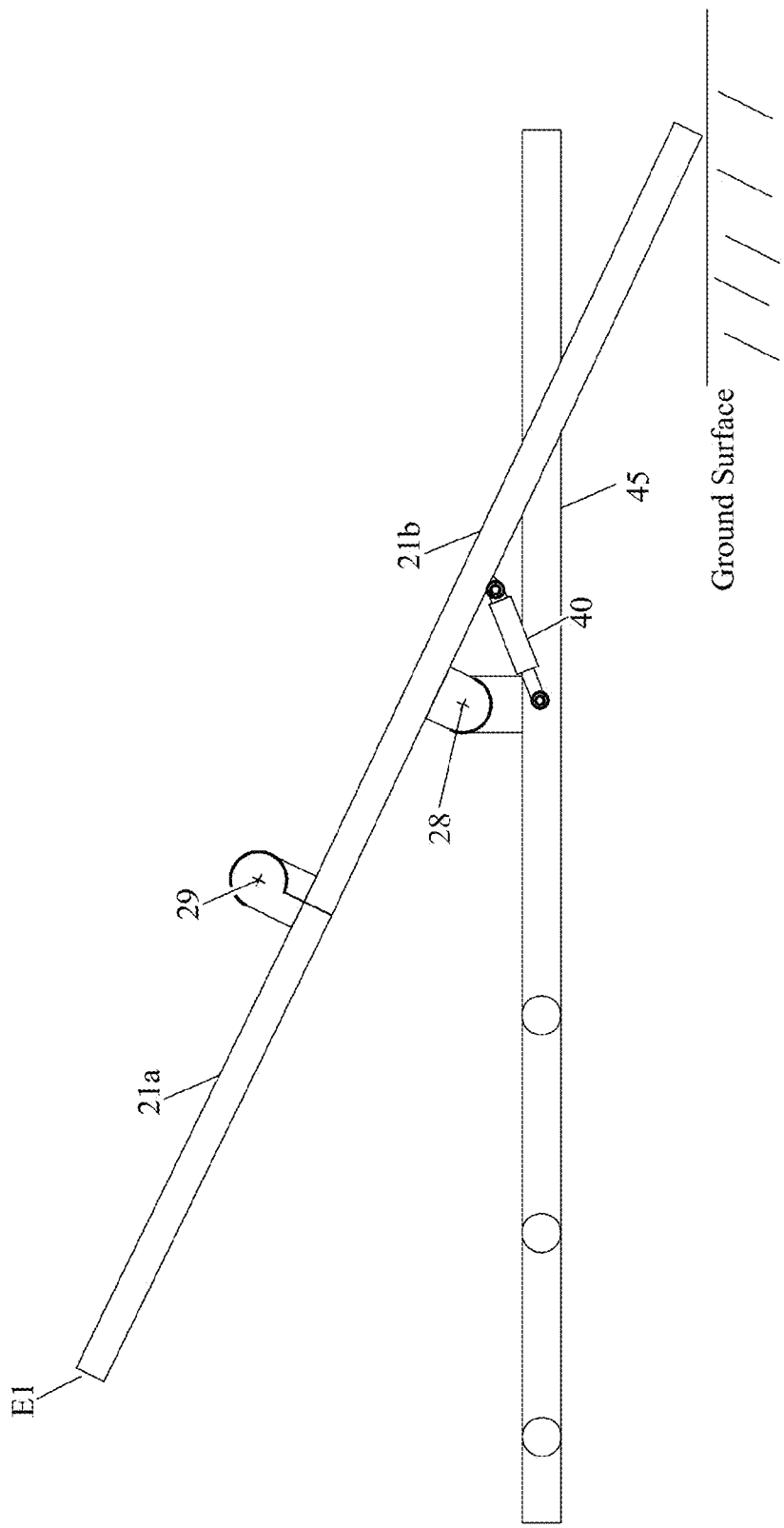
FIG. 14 shows the storage box carrier of a mobile picking platform in an unload position.

The unload position is illustrated in FIG. 6 and FIG. 14. In the unload position, the storage box carrier 21 is also in a straight orientation with the first carrier section 21a and second carrier section 21b in alignment. The first end E1 of the storage box carrier 21 is, however, at a higher position than the second end E2 of storage box carrier 21, so that the storage box carrier 21 is angled downward towards the second end E2 of the storage box carrier 21. As the storage box carrier 21 is provided with a storage box drive unit conveyor rollers 55 on an upper surface of the storage box carrier 21, full storage boxes 13 may be easily unloaded and positioned on a ground surface. The second end E2 of the storage box carrier 21 may also be positioned to coincide with a shuttle trailer 23 having a storage box drive unit in the form of conveyor rollers 55 on an upper surface of the shuttle trailer 23, so that storage boxes 13 may be directly transferred between the shuttle trailer 23 and the mobile picking platform 20. Conveyor rollers 55 may be freewheeling, and permit storage boxes 13 to move by gravitational force. Alternatively, conveyor rollers 55 may be driven and actively move storage boxes 13.

Figure 7:
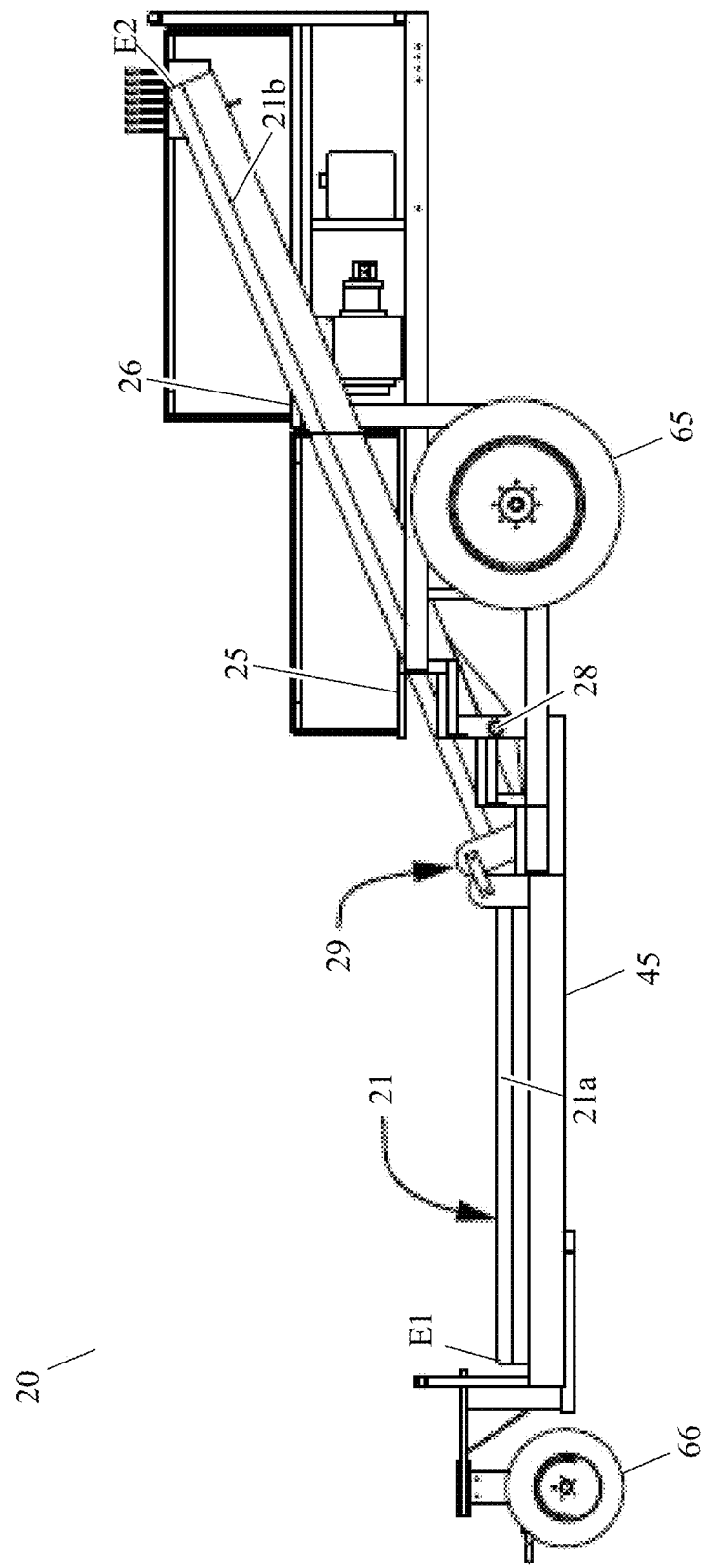
FIG. 7 shows a mobile picking platform having a storage box carrier in a pick position.

Referring now to FIG. 7 and FIG. 12, in the pick position, the first carrier section 21a is lowered near ground level, and substantially horizontal. Hence, storage boxes on the first carrier section 21a may be easily accessed pickers 12 standing on the ground. The second carrier section 21b slopes upwardly from the hinge 29 toward the second end of the storage box carrier 21 and provides access to storage boxes 13 at elevated positions, enabling pickers 12 on the middle zone platforms 25 and upper zone platforms 26 to easily fill the storage boxes 13.

In one embodiment, the mobile picking platform 20 is provided with a variable speed drive to enable harvesting at various speeds, depending on the fruit loading of trees and other picking conditions. Any type of drive known in the art may be implemented, including, but not limited to, hydraulic drives, hydrostatic drives, electric drives, or mechanical drives. Preferably the drive system is capable of propelling the mobile picking platform 20 at a variable speed. The speed of the mobile picking platform 20 during actual picking is preferably relatively slow, roughly 20 ft/minute, however drive speed may vary depending on conditions and usage. Alternatively, the mobile picking platform may be towed by a prime mover with variable speed capacity, such as a tractor 14, skid steer, or other self-propelled vehicle with sufficient towing capacity.

In some embodiments, the mobile carriage 45 of the mobile picking platform 20 is provided with front and rear steering axles. The front wheel steering axles provide primary steering capability, and the rear wheel steering axles provide increased maneuverability at the ends of rows 11 and improved tracking on hillsides. In other embodiments, the mobile picking platform 20 may be provided with one steering axle at the front wheels or the back wheels at the expense of maneuverability.

As shown in FIG. 7, for example, the mobile picking platform 20 is, in some embodiments, a three wheel configuration with two main support wheels 65 at one end of the mobile picking platform 20, and a single support and steering wheel 66 at another end of the mobile picking platform 20. However, other configurations are foreseen and are dependent on various factors such as terrain, stability, and type of drive system selected. These other configurations include, but are not limited to, multiple drive wheels, tracks 70 as shown in FIG. 8, additional wheels, and tracks in the front being either driven or freewheeling.

Figure 8:
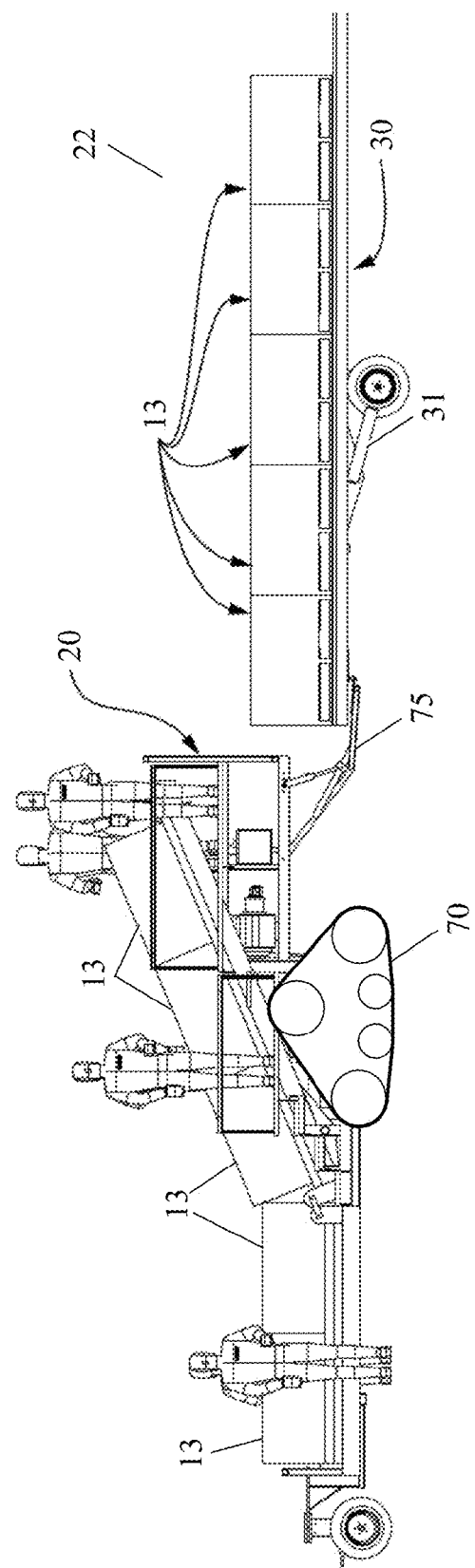
FIG. 8 shows a mobile picking platform having a set of tracks trailing a storage unit carrying multiple empty storage boxes.

FIG. 8 shows a storage unit 22, which allows for number of storage boxes 13 to be stored and trailed behind the mobile picking platform 20. In one embodiment the storage unit 22 is coupled to the mobile picking platform by an articulated coupling such as a three point hitch. In some embodiments the storage unit 22 may be independent and self-propelled. While FIG. 8 shows the storage unit 22 loaded with five storage boxes 13, the number of storage boxes 13 on the storage unit 22 will generally be equal to the number of storage boxes 13 on the mobile picking platform 20. In practice, the number of storage boxes 13 used with the mobile picking platform 20 and storage unit 22 may range from one to ten storage boxes.

The storage unit 22 includes a storage box drive unit. In one embodiment, the a storage box drive unit may be a set of conveyor rollers 55 as previously shown on the first carrier section 21a in FIG. 16. Alternatively, as shown in FIG. 17 in conjunction with a first carrier section 21a and second carrier section 21b, the storage box drive unit may be a driven chain conveyor 60 on a top surface of the bed 30 of the storage unit 22. The bed 30 the storage unit 22 is fixed to a mobile carriage 31 such that the bed of the storage unit 22 may be placed at various heights above a ground surface.

The bed 30 of the storage unit 22 has two extreme operating positions at a "down" position and an "up" position. The down position is generally used for transporting and reloading storage boxes 13, and the up position allows the bed 30 to pass over storage boxes 13 that are on the ground. At an intermediate position, the bed 30 is positioned to transfer storage boxes 13 to the storage box carrier 21 of mobile picking platform 20. It will be understood that the storage unit 22 may also operate at any height between the up position and the down position. The storage unit 22 enables empty storage boxes 13 to be quickly transferred from a shuttle trailer 23, and/or full storage boxes 13 to be transferred to the shuttle trailer 23. The storage unit 22 may be loaded when the storage unit 22 is stopped, or while the storage unit 22 is moving at the nominal picking speed.

Figure 9A:
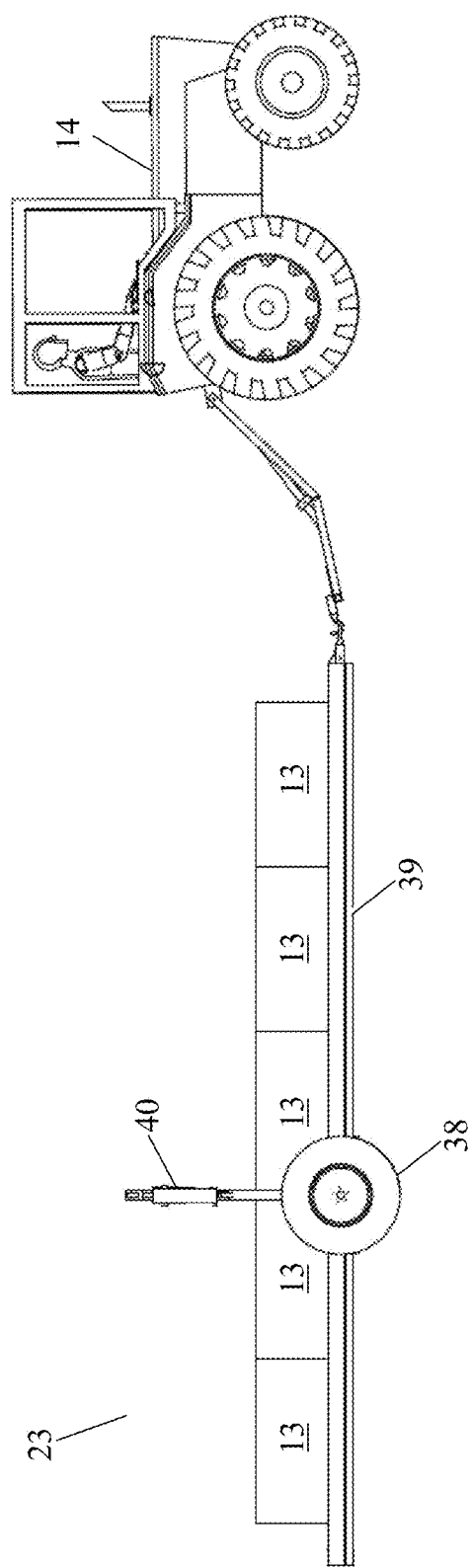
FIG. 9A shows a shuttle trailer with a bed trailed by a tractor.
Figure 9B:
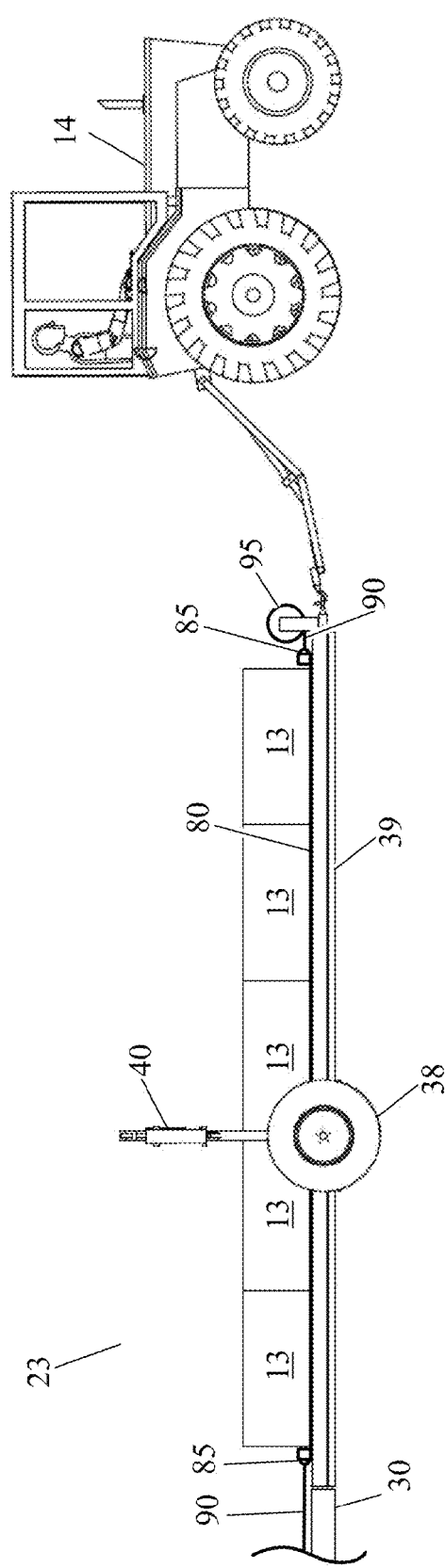
FIG. 9B shows a shuttle trailer with empty storage boxes on a slip sheet used to transfer the empty storage boxes to the storage unit.
Figure 9C:
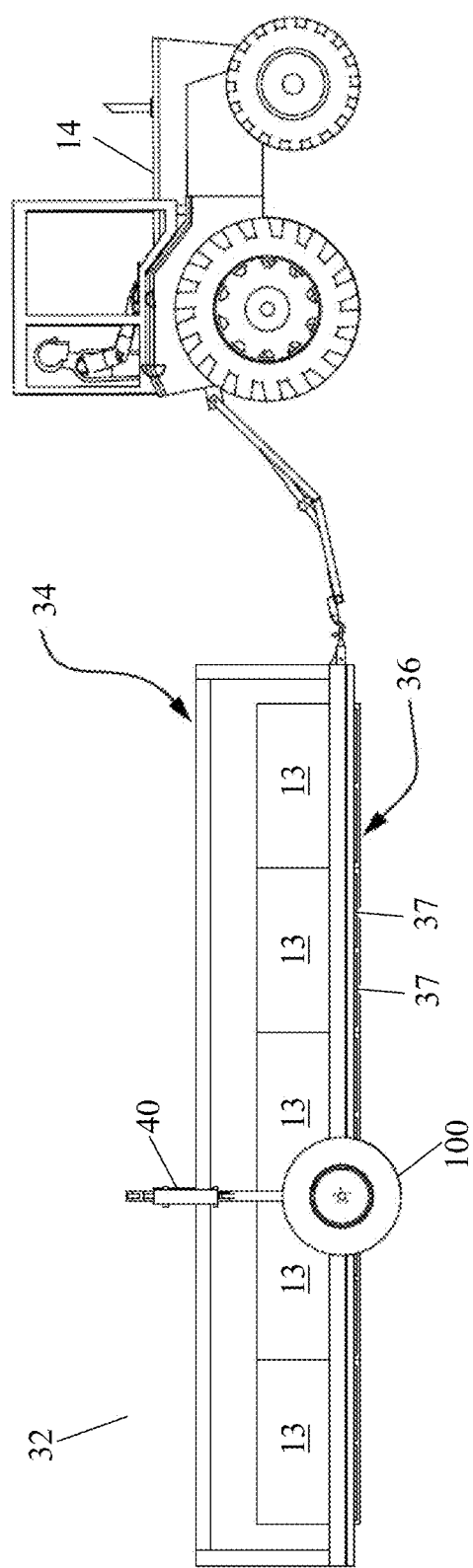
FIG. 9C shows a shuttle trailer with lifting arms and retractable forks carrying multiple storage boxes.

A shuttle trailer 23, shown in FIG. 3 and FIGS. 9A-9B, moves multiple storage boxes 13 in and out of access lanes 11a. In one embodiment, shown in FIG. 9A, the bed 39 of the shuttle trailer 23 is mounted to a mobile carriage 38a and is height adjustable by a lifting mechanism 40, such as a hydraulic cylinder. The bed 39 of the shuttle trailer 23 may include conveyor rollers 55 as previously shown in FIG. 16, and in another embodiment may include a storage box drive mechanism such as the chain conveyor 60 shown in FIG. 17. In this latter embodiment, the chain conveyor 60 transfers storage boxes 13 to and from the storage unit 22, and to and from the ground.

To load storage boxes 13 that are located on the ground, the shuttle trailer 23 is lowered to ground level, and one end of the shuttle trailer 23 is positioned under a lower edge of a storage box 13. An end of the shuttle trailer 23 may be equipped with an angled flange or plate for this purpose. As the shuttle trailer 23 is advanced toward the storage box 13 while the chain conveyor 60 is in operation, the chain conveyor 60 engages the storage box 13 and pulls the storage box 13 onto the bed of the shuttle trailer 23. The shuttle trailer 23 may then be raised to a transport position. To unload storage boxes 13 onto the ground from the shuttle trailer 23, the same loading is performed in reverse.

Storage boxes 13 may be transferred from the shuttle trailer 23 to the storage unit 22 by adjusting the height of the bed 39 of the shuttle trailer 23 to the bed 30 of the storage unit 22 and bringing the bed 30 of the storage unit 22 and the bed 39 of the shuttle trailer 23 in alignment. The chain conveyor 60 then moves the storage boxes 13 off the bed 39 of the shuttle trailer 23 and onto the storage unit 22. Similarly, storage boxes 13 may be transferred from the storage unit 22 to the shuttle trailer by reversing the direction of the chain conveyor 60.

In an alternate embodiment, shown in FIG. 9B, storage boxes 13 may be placed on a "slip sheet" 80 on the bed 39 of the shuttle trailer 23. Thus, storage boxes 13 may be transferred to the bed 30 of the storage unit 22 by aligning an end of the storage unit 22 with an end of the shuttle trailer 23 and pulling an end of the slip sheet 80 onto the storage unit 22. A cable 90 on a winch 95 on the storage unit 22 is then coupled 85 to an end of the slip sheet 80 to pull the slip sheet 80 from the shuttle trailer 23 onto the storage unit 22, along with the storage boxes 13 resting on the slip sheet 80. Similarly, storage boxes 13 may be transferred from the storage unit 22 to the shuttle trailer 23 by a cable 90 and winch 95 pulling an opposite end of the slip sheet 80 from the storage unit 22 to the shuttle trailer 23, thus moving the entire slip sheet 80 and the storage boxes 13 on the slip sheet 80 to the shuttle trailer 23. It will be understood that while FIG. 9B illustrates a shuttle trailer 23 having a cable 90 on a winch 95 on one end of the shuttle trailer 93, a cable 90 on a winch 95 may similarly be fixed, whether removably or permanently, on one or both ends of the shuttle trailer 23, storage unit 22, and/or mobile picking platform 20.

Another shuttle trailer 32 embodiment, shown in FIGS. 9C-9G, uses a clamp mechanism with retractable forks 37 to transfer storage boxes 13 between the shuttle trailer 32 and the storage unit 22, and between the shuttle trailer 32 and a ground surface. Clamp style shuttle trailers 32 include a mobile carriage 34 to which wheels 38 are attached via a lifting mechanism 40, for example, a hydraulic piston. The mobile carriage 34 is fitted with lifting arms 36 that include a series of retractable forks 37 at opposite sides of the mobile carriage 34 along the length of the mobile carriage 34.

The mobile carriage 34 has a down position adjacent to a ground surface, as shown in FIGS. 9D-9E, and an up position in which the mobile carriage 34 may pass over the storage unit 22 when the storage unit 22 is in a down position, as shown in FIGS. 9F-9G. The lifting arms 36 and retractable forks 37 have an empty position away from a center of the mobile carriage 34, as shown in FIG. 9D and a carry position toward the center of the mobile carriage 34, as shown in FIGS. 9E-9G.

As shown in FIG. 9D, when the mobile carriage 34 is in the down position and the lifting arms 36 and retractable forks 37 are in the empty position, the retractable forks 37 may be aligned with fork pockets 13a at bottom edges of storage boxes 13. As shown in FIG. 9E, the lifting arm 36 and retractable forks 37 are then moved from the empty position to the carry position, for example, by hydraulic cylinders 110. The retractable forks 37 are then received by the fork pockets 13a of the storage boxes 13. As shown in FIG. 9F, the mobile carriage 34 is then lifted using the lifting mechanism 40, which in turn lifts the storage boxes 13 on the retractable forks 37. The shuttle trailer 32 is unloaded by lowering the mobile carriage 34 and moving the lifting arms 36 and retractable forks 37 to the empty position. The retractable forks 37 thus retract from the fork pockets of the storage boxes 13, releasing the storage boxes 13.

To load the storage unit 22, the storage unit 22 is lowered to its down position, and the shuttle trailer 32 is positioned over the storage unit 22 with the wheels 100 of the shuttle trailer 32 straddling the bed 30 of the storage unit 22. As shown in FIG. 9G, the shuttle trailer 32 is then lowered until the storage boxes 13 rest on the bed 30 of the storage unit 22. The lifting arms 36 and retractable forks 37 are then moved to the empty position, and the shuttle trailer 32 may be moved away from the storage unit 22, leaving the storage boxes 13 on the storage unit 22. Storage boxes 13 may be removed from the storage unit 22 by reversing this process.

In various embodiments, the shuttle trailer 23, 32 may be self-propelled, or may be towed by a prime mover, such as a tractor 14, a fork lift, a skid steer, or other vehicle. While the shuttle trailer 23, 32 has been shown with one set of wheels 100, it will be understood that this configuration is for illustrative purposes only, and that other configurations are possible, including but not limited to, having multiple sets of wheels, steerable wheels or casters, and tracks.

FIGS. 10A-10G illustrate a sequence of interactions between the mobile picking platform 20, the storage unit 22, and the shuttle trailer 32 during a picking operating.

Figure 10A:
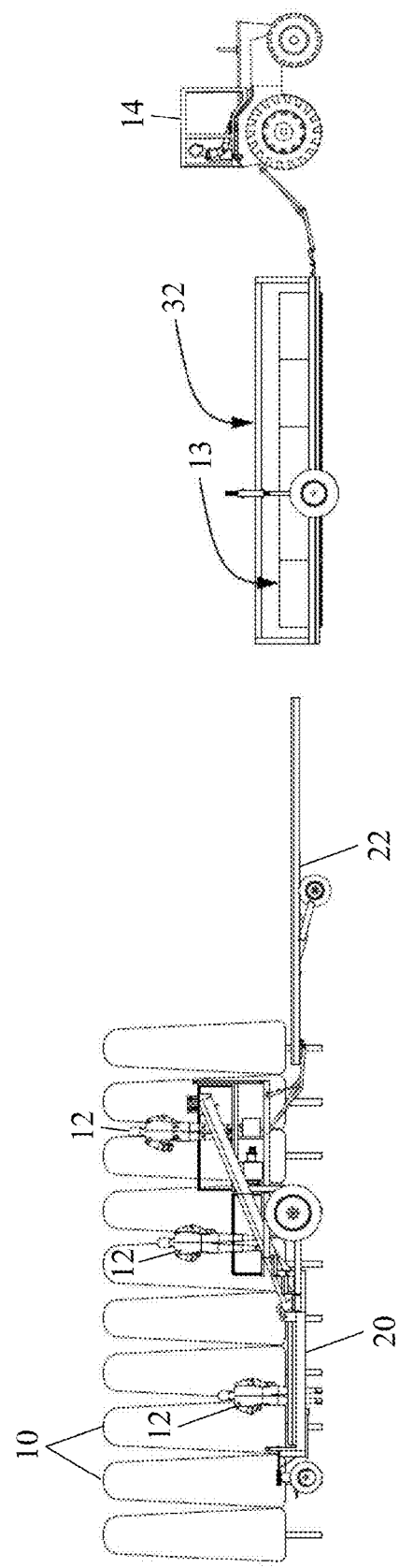
FIG. 10A shows a mobile picking platform, storage unit, and shuttle trailer at the start of a harvesting operation.
Figure 10B:
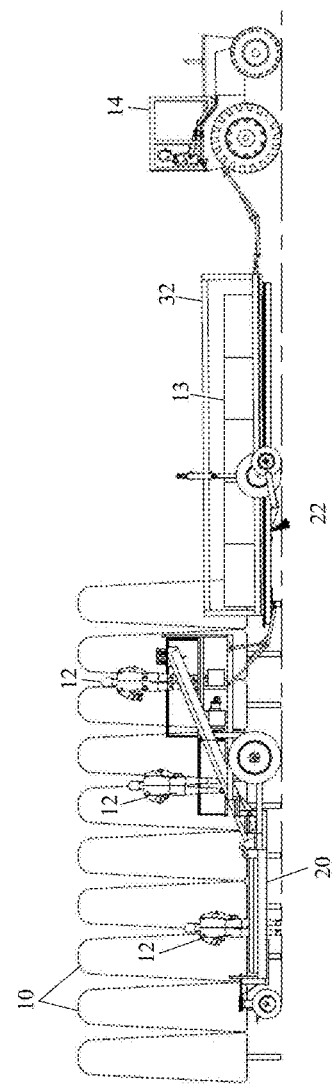
FIG. 10B shows a shuttle trailer transferring empty storage boxes to a storage unit.

FIG. 10A shows a shuttle trailer 32 with five empty storage boxes 13 being brought to the storage unit 22 when the storage unit 22 is at a down position. FIG. 10B shows the shuttle trailer 32 straddling the storage unit 22 and depositing the empty storage boxes 13 on the storage unit 22. After depositing the storage boxes 13 on the storage unit 22, the shuttle trailer 23 is moved away from the storage unit 22.

Figure 10C:
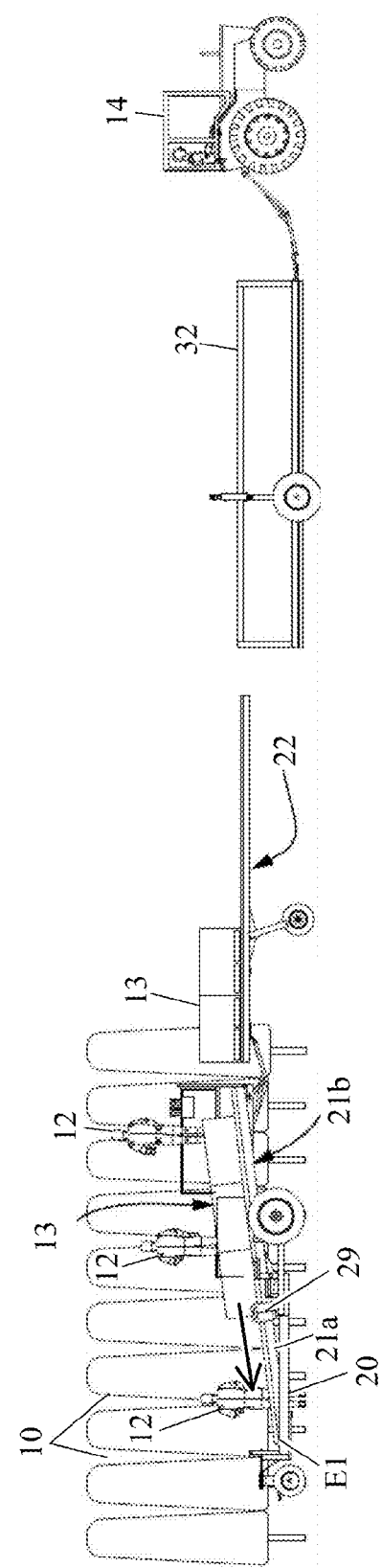
FIG. 10C shows a storage unit transferring empty storage boxes to the storage box carrier of a mobile picking platform.

When storage boxes 13 are on the storage unit 22 and no storage boxes 13 are on the mobile picking platform 20, as shown in FIG. 10C, the storage unit 22 is elevated to the up position, and the storage box carrier 21 of the mobile picking platform 20 is oriented in a load position by pivoting the second carrier section 21b and bringing the first carrier section 21a and second carrier section 21b into linear alignment at the hinge 29. When first carrier section 21a and second carrier section 21b are aligned, storage boxes 13 are driven, via the chain conveyor 60 on the storage unit 22, from the storage unit 22 onto the storage box carrier 21 of the mobile picking platform 20. The storage box carrier 21 is at an angle relative to the horizontal in this load position, and therefore the empty storage boxes 13 slide to the first end E1 of the storage box carrier 21 on the conveyor rollers 55 of the storage box carrier 21.

Figure 10D:
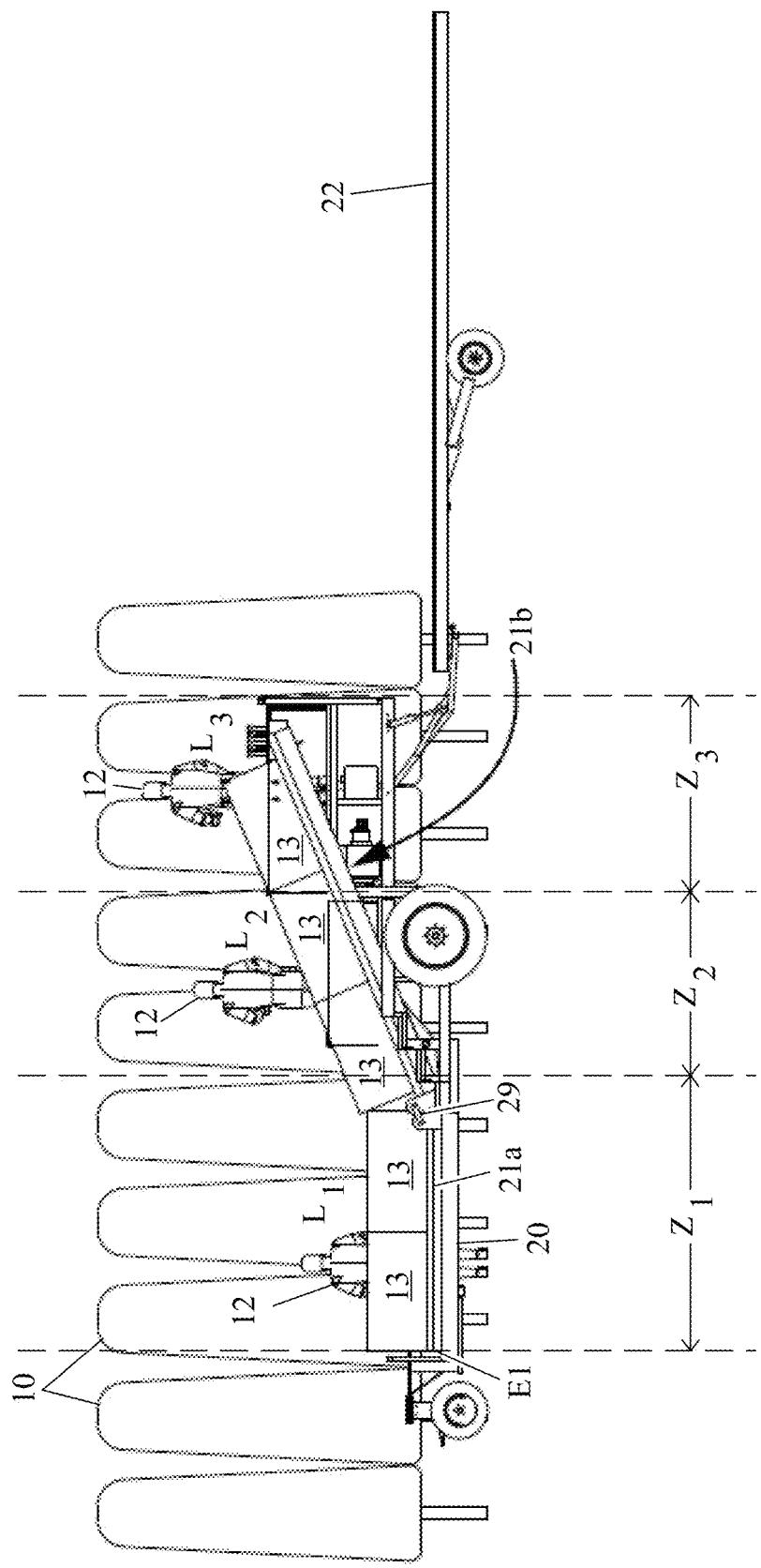
FIG. 10D shows a mobile picking platform while harvesting.

As shown in FIG. 10D, after the empty storage boxes 13 are loaded on the storage box carrier 21, the storage box carrier 21 is articulated to the pick position, in which the first carrier section 21a is oriented substantially parallel to the ground, and the second carrier section 21b is oriented at an upward angle from the hinge 29. Thus, two storage boxes 13 are placed near the ground surface and three boxes are elevated at an angle, providing pickers 12 with access to storage boxes 13 at different levels $L_1$, $L_2$, $L_3$ above the ground.

The mobile picking platform 20 preferably moves continuously to provide maximum harvest efficiency, and the speed is adjusted to ensure that pickers 12 are able to maximize the harvest of fruit available on trees 10 in each picking zone $Z_1$, $Z_2$, $Z_3$ and at each picking level $L_1$, $L_2$, $L_3$. The number of pickers 12 in each picking zone $Z_1$, $Z_2$, $Z_3$ may also be modified to account for distribution of the fruit on the trees 10. While the empty storage boxes 13 on the mobile picking platform 20 are being filled by pickers 12, another set of empty boxes is loaded on to the storage unit 22 as previously described in FIGS. 10A-10B.

Figure 10E:
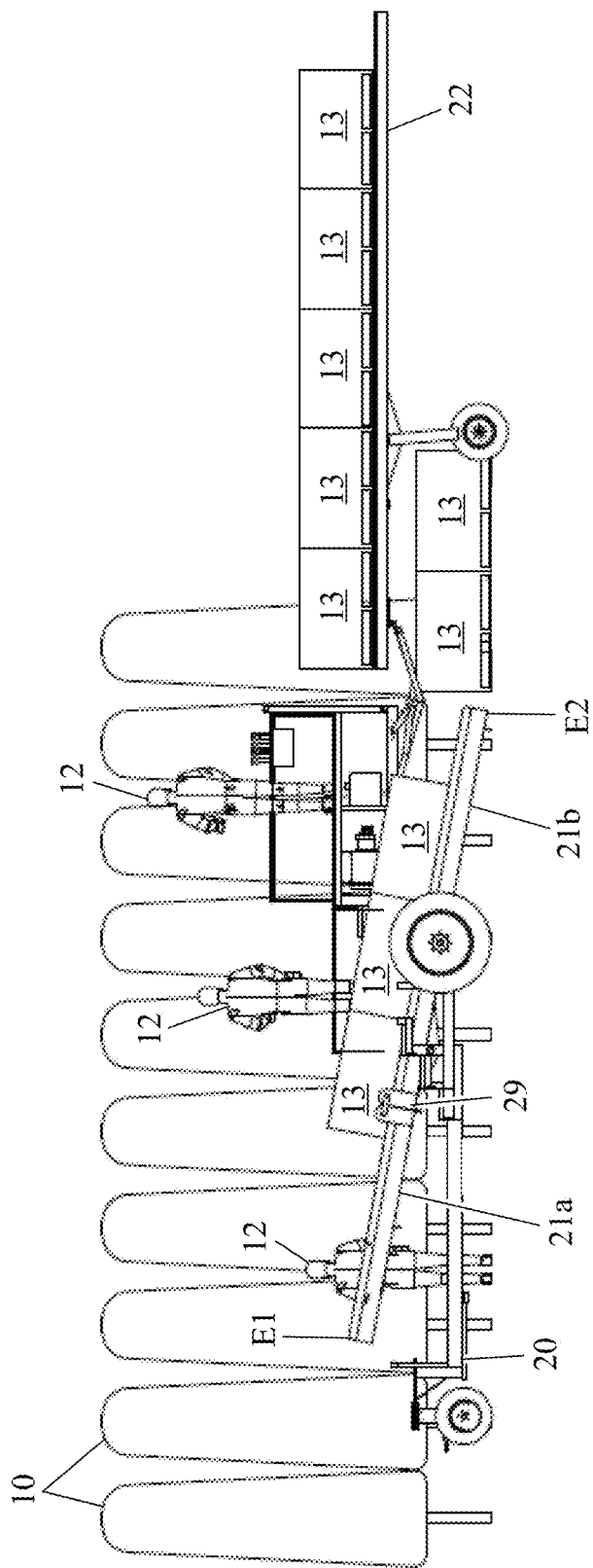
FIG. 10E shows a mobile picking platform unloading full storage boxes onto a ground surface with a storage unit in an up position passing over the full storage boxes on the ground surface.

FIG. 10E illustrates storage box 13 transfer from the mobile picking platform 20 to the ground, after all five storage boxes 13 on the storage box carrier 21 of the mobile picking platform 20 have been filled. The second carrier section 21b is pivoted and the hinge 29 locks up, lifting the first carrier section 21a, and moving the second end E2 of the storage box carrier 21 to ground level. In this orientation, the second end E2 of the storage box carrier 21 is lower than the first end E1 of the storage box carrier 21, and the full storage boxes 13 will move on the conveyor rollers 55 of the storage box carrier 21 to the ground as the mobile picking platform 20 advances along the access lane 11a. During this transfer operation, the storage unit 22 is placed in the up position and passes over the full storage boxes 13 on the ground.

Figure 10F:
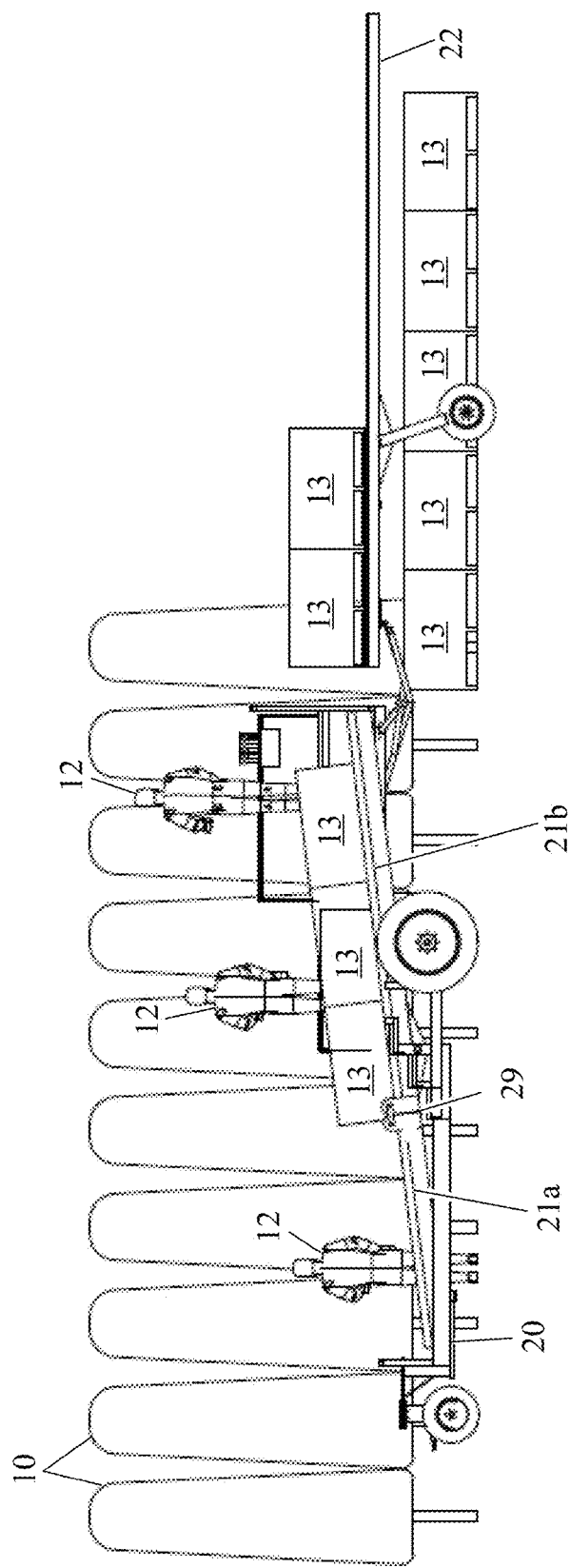
FIG. 10F shows a storage unit in an up position passing over full storage boxes on a ground surface while transferring empty storage boxes to the storage box carrier of a mobile picking platform.

As illustrated in FIG. 10F, after the full storage boxes are transferred to the ground, empty storage boxes 13 on the storage unit 22, which is now in an up position for loading the storage box carrier 21, are transferred to the mobile picking platform 20 as previously described for FIG. 10C.

Figure 10G:
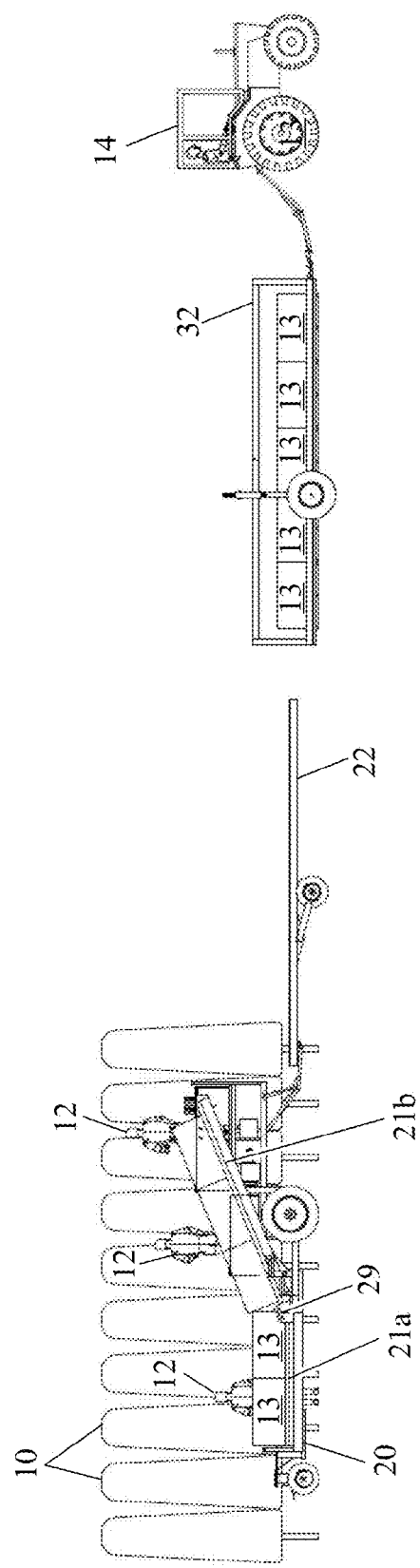
FIG. 10G shows a shuttle trailer after picking up full storage boxes from a ground surface and transporting the full storage boxes away from a picking site.

As shown in FIG. 10G, when the transfer of empty boxes 13 from the storage unit 22 to the storage box carrier 21 is completed, and the storage unit 22 has moved past the full storage boxes 13 transferred to the ground from the storage box carrier 21, the storage unit 22 is again lowered to a down position for reloading with empty storage boxes 13. When the mobile picking platform 20 and storage unit 22 have moved past the full storage boxes 13 on the ground, the shuttle trailer 32 is able to pick up the full storage boxes 13, as previously described in FIGS. 9C-9G, and transfer them to the staging area for full boxes of fruit.

When full storage boxes 13 are transferred from the mobile picking platform 20 to the ground, the speed and motion of the full storage boxes 13 moving on the storage box carrier 21 may be controlled, as shown in FIG. 18, by a length of chain 115 attached to the end the storage box carrier 21. The chain 115 is connected to a rope 125, and the rope 125 is wrapped around a post 120 providing friction. The rope 125 wrapped around the post 120 is subject to a capstan effect, in which a very small amount of tension on the rope 125 on one side of the post 120 can provide a significant amount of tension on the rope 125 on the opposite of the post, and enough force multiplication for the operator to control the motion of the full storage boxes 13. Once the full storage boxes 13 are on the ground, the rope 125 is released, allowing the mobile picking platform 20 to unload the all the full storage boxes 13 without interfering with the next group of empty storage boxes 13 to be loaded from the storage unit 22.

Figure 11:
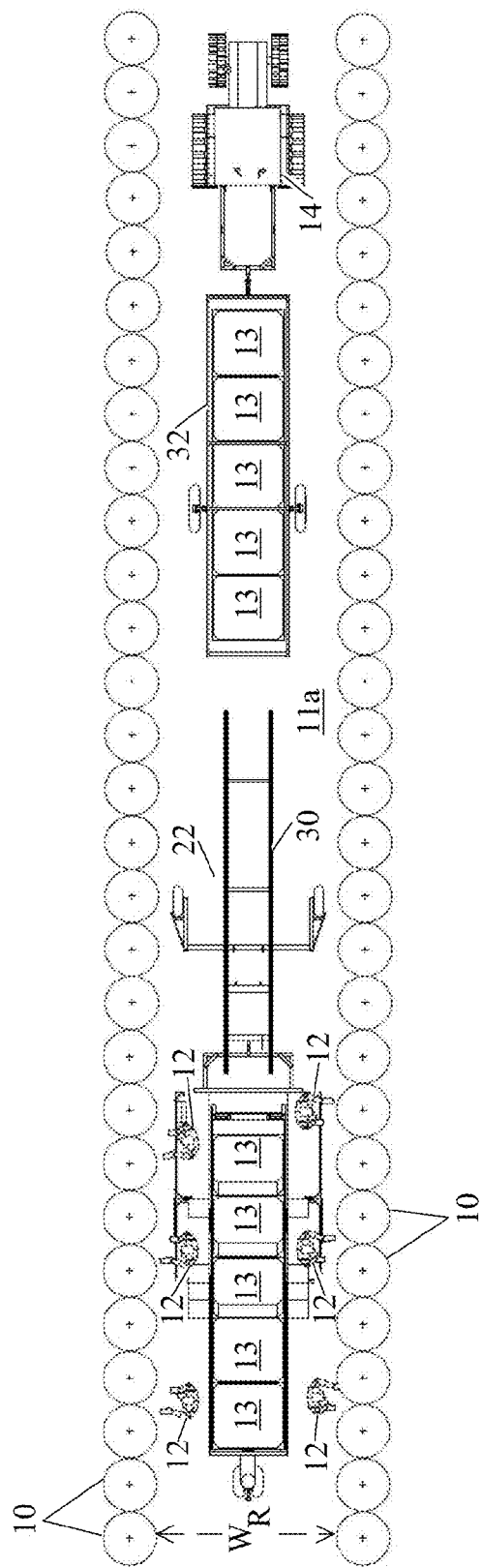
FIG. 11 shows a mobile picking platform system in an access lane.

As shown in FIGS. 10A-10G, the storage box 13 exchange sequence solves the key problem of moving full and empty storage boxes 13 in the confines of the access lane 11a. FIG. 11 further illustrates the mobile picking platform 20 spanning an access lane width $W_R$ which enables trees 10 on both sides of the access lane 11a to be picked simultaneously, with no need for storage boxes 13 or equipment to pass around the mobile picking platform 20 in the access lane 11a.

The mobile picking platform 20, storage unit 22, and shuttle trailer 23, 32 described herein significantly improve a number of aspects of a harvesting operation. A self-propelled mobile picking platform 20 towing a storage unit 22 eliminates a need for a pull tractor or other prime mover. Thus, costs are reduced and access for pickers 12 to move around the mobile picking platform 20 is improved for more efficient harvesting.

The storage box carrier 21 has three nominal positions: unload, load, and pick. The pivot 28 and hinge 29 of the storage box carrier 21 enables a single lifting mechanism 40, for example set of hydraulic cylinders, to raise, lower and tilt the first carrier section 21a and second carrier section 21b of the storage box carrier 21. As a result, the lifting mechanism 40 and pivot 28 may be arrange so that pickers 12 are provided with storage boxes 13 at easily accessible elevations, without increasing the height of the lower storage boxes 13 at the first end E1 of the storage box carrier 21, or adding excess complexity to the overall system.

This construction enables storage boxes 13 on the first carrier section 21a to be located near the ground level $L_1$, and the angled second carrier section 21b provides easy access to storage boxes 13 for pickers 12 at higher picking levels $L_2$, $L_3$. While a distribution of five storage boxes 13, with two storage boxes on the first carrier section 21a and three storage boxes 13 on the second carrier section 21b, has been shown and described. However, other distributions and other numbers of storage boxes 13 may also be configured.

The bed 30 of the storage unit 22 has been shown in FIG. 11 as a set of rails on wheels. In one embodiment, the rails may be slightly curved, and bent away from the ground. Pre-bending the frame in this manner counteracts potential sag caused by the weight of the storage boxes 13, and the resulting slight elevation of the ends of the frame reduces incidental contact with the ground, particularly on uneven terrain.

In the configuration shown in FIG. 11, the position of the axle 130 of the storage unit 22 allows the axle 130 to act as a stop for the shuttle trailer 32 as the shuttle trailer 32 is backed over the storage unit 22. Once the wheels of the shuttle trailer 32 come into contact with the axle 130 of the storage unit 22, the alignment between the shuttle trailer 32 and the storage unit 22 is correct, and the shuttle trailer 32 may be lowered and the storage boxes 13 released. Coordinated design between the shuttle trailer 32 and the storage unit 22 allows other similar configurations that simplify docking between the shuttle trailer 32 and the storage unit 22. For example, in one embodiment guide rails may be incorporated on the shuttle trailer 32 and the storage unit 22 that assist in alignment. Including a set of lockable caster wheels, or multiple steerable wheels, on the shuttle trailer may also simplify alignment of the shuttle trailer 32 and the storage unit 22.

Incorporation of unpowered conveyor rollers 55 on the storage box carrier 21 provides for easy and low cost storage box 13 handling. Storages boxes 13 roll on the storage box carrier 21 when the second end E2 of the storage box carrier 21 is tipped up, and roll off the storage box carrier 21 when the second end E2 of the storage box carrier 21 is when tipped down. Gravity feed eliminates the need for additional drive systems, although they may optionally be used. The conveyor rollers 55 rest in channels and are easily removable for cleaning or repair.

Figure 20:
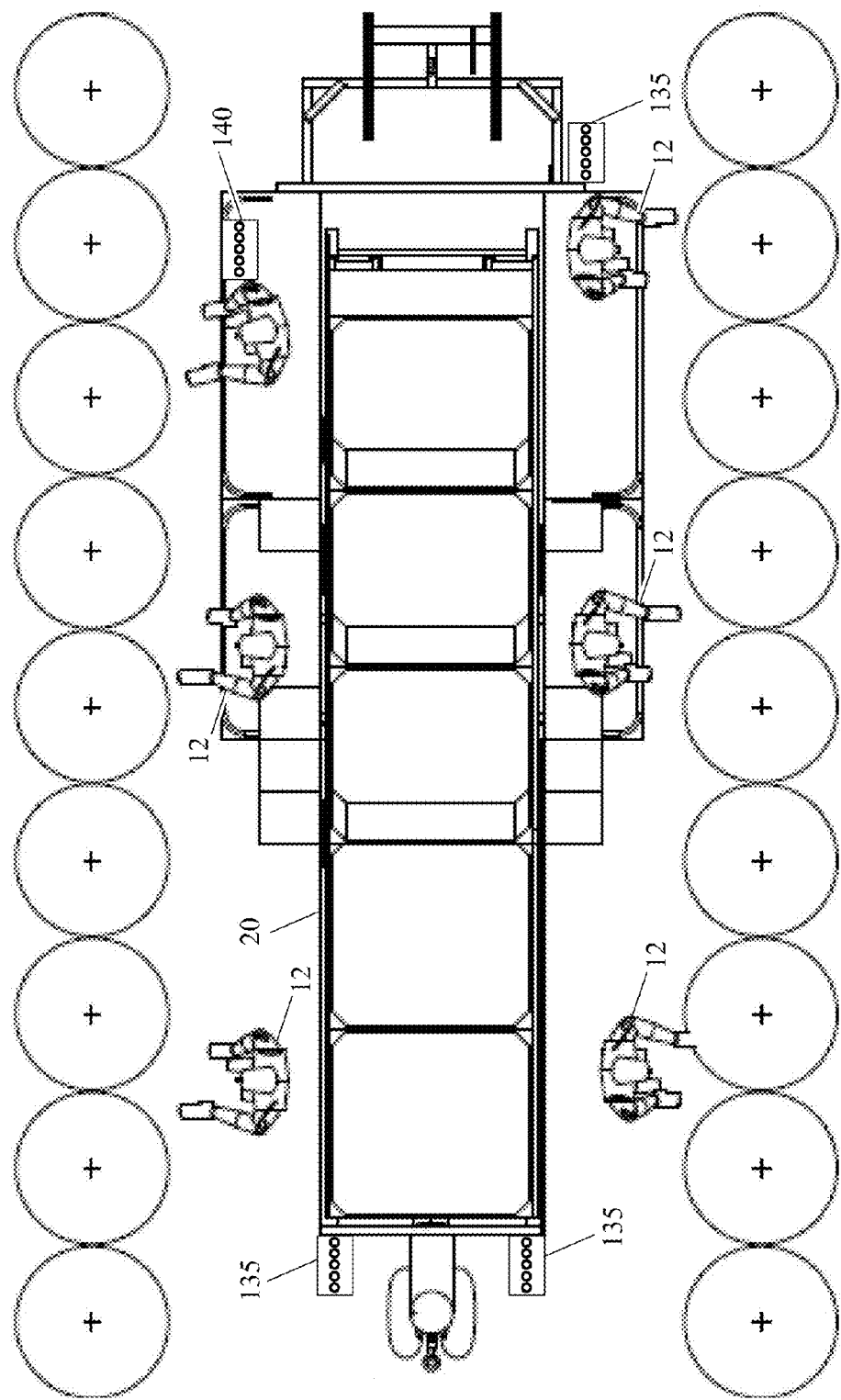
FIG. 20 shows a mobile picking platform with multiple operating stations.

As shown in FIG. 20, incorporating control stations, for example electrically controlled hydraulic valves, for controlling the forward motion and steering of the mobile picking platform 20 allows auxiliary operator stations 135 to be positioned at, for example, the two front corners of the mobile picking platform 20 and the upper rear of the mobile picking platform 20 opposite a main control station 140. These auxiliary operator stations 135 enable an operator to stop and start the forward motion of the mobile picking platform 20, and to adjust the forward steering position, from multiple locations. These locations enable any selected number of the pickers 12 to control the key functions required to maintain optimum position of the mobile picking platform 20 while harvesting.

In some embodiments, the mobile picking platform 20 includes automatic steering using electrical controls, combined with various sensing methods. Sensing methods include, but are not limited to, sensing wands that track the pickers' position, electric eyes that monitor edge of the tree rows 11, sensors that track buried guide wires or tree support wires, or a combination of these techniques. Other sensing methods such as a following a groove in the center of the access lane 11a with the use of simple contact switches to steer the unit. A Global Positioning System (GPS) may also be incorporated, in conjunction with computer maps of the orchard, to track and adjust the direction of the mobile picking platform 20.

In some embodiments, the mobile picking platform 20 may include four wheel steering to improve the maneuverability of the mobile picking platform 20. The rear wheels of the mobile picking platform 20 may counter steer to reduce the turn radius of the mobile picking platform 20, which is particularly useful at the ends of the rows 11. Steering the rear wheels in the same direction as the front wheels helps the mobile picking platform 20 to track better on side hills.

The functions of the storage unit 22 and shuttle trailer 23 may also be combined into a single trailer (not shown in the drawings). In this embodiment, a shuttle trailer 23 with a storage box drive, such as a chain conveyor 60, with an extended lift range and the ability to straddle storage boxes 13 on the ground is configured. This chain drive shuttle trailer 23 includes a low position for transport, and a high position for loading the mobile picking platform 20. In the high position, the chain drive shuttle trailer 23 also has clearance over full storage boxes 13 in the access lane 11a after the storage boxes 13 are transferred to the ground from the mobile picking platform 20. Harvesting operations with this chain drive shuttle trailer 23 are similar to the operation described in FIGS. 10A-10G, with a few exceptions.

Full storage boxes 13 are transferred to the ground from the mobile picking platform 20, and the mobile picking platform 20 comes to a stop after it is fully unloaded. At this time, the storage box carrier 21 is raised to the load position, and the chain drive shuttle trailer 23 is raised up to the load position, providing clearance over the full storage boxes 13 on the ground behind the mobile picking platform 20. The mobile picking platform 20 and the chain drive shuttle trailer 23 are docked together, with the chain drive shuttle trailer 23 straddling the full storage boxes 13 on the ground. Empty storage boxes 13 on the chain drive shuttle trailer 23 are then transferred to the mobile picking platform 20. Once all the empty storage boxes 13 are loaded onto the mobile picking platform 20, the two units separate, and the mobile picking platform 20 continues to progress down the access lane 11a harvesting fruit. The chain drive shuttle trailer 23 then is free to move and lower to pick up the full storage boxes 13 for removal from the orchard. This system implementation eliminates the storage unit 22, but requires more precise coordination between the chain drive shuttle trailer 23 and the mobile picking platform 20.

Figure 23:
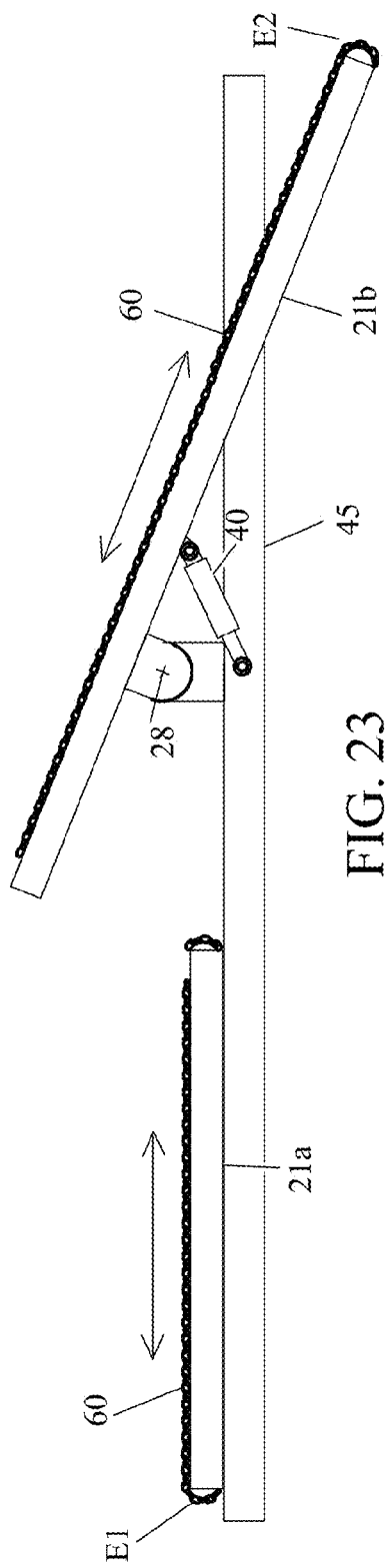
FIG. 23 shows a hingeless storage box carrier of a mobile picking platform with a chain conveyor in an unload position.

As shown in FIG. 17, a storage box drive in the form of a chain conveyor 60 may also be included on the first carrier section 21a of the storage box carrier 21, instead of the free running conveyor roller system shown in FIG. 16. As shown in FIGS. 21-23, the first carrier section 21a in this embodiment is fixed, the hinge 29 is eliminated, and the second carrier section 21b is allowed to pivot as described herein. When loading storage boxes 13, the chain conveyor 60 runs in a forward direction, moving storage boxes 13 toward the first end E1 of the storage box carrier 21, and when unloading the chain conveyor 60 runs in the reverse direction. This embodiment eliminates the pivot hinge system at the expense of a storage box drive in the form of a chain conveyor 60 on the first carrier section 21a. In some embodiments, the chain driven transport may also be included on the second carrier section 21b. FIG. 21 shows a second carrier section 21b in the pick position. FIG. 22 shows a second carrier section 21b in the load position. FIG. 23 shows a second carrier section 21b in the unload position.

Figure 24:
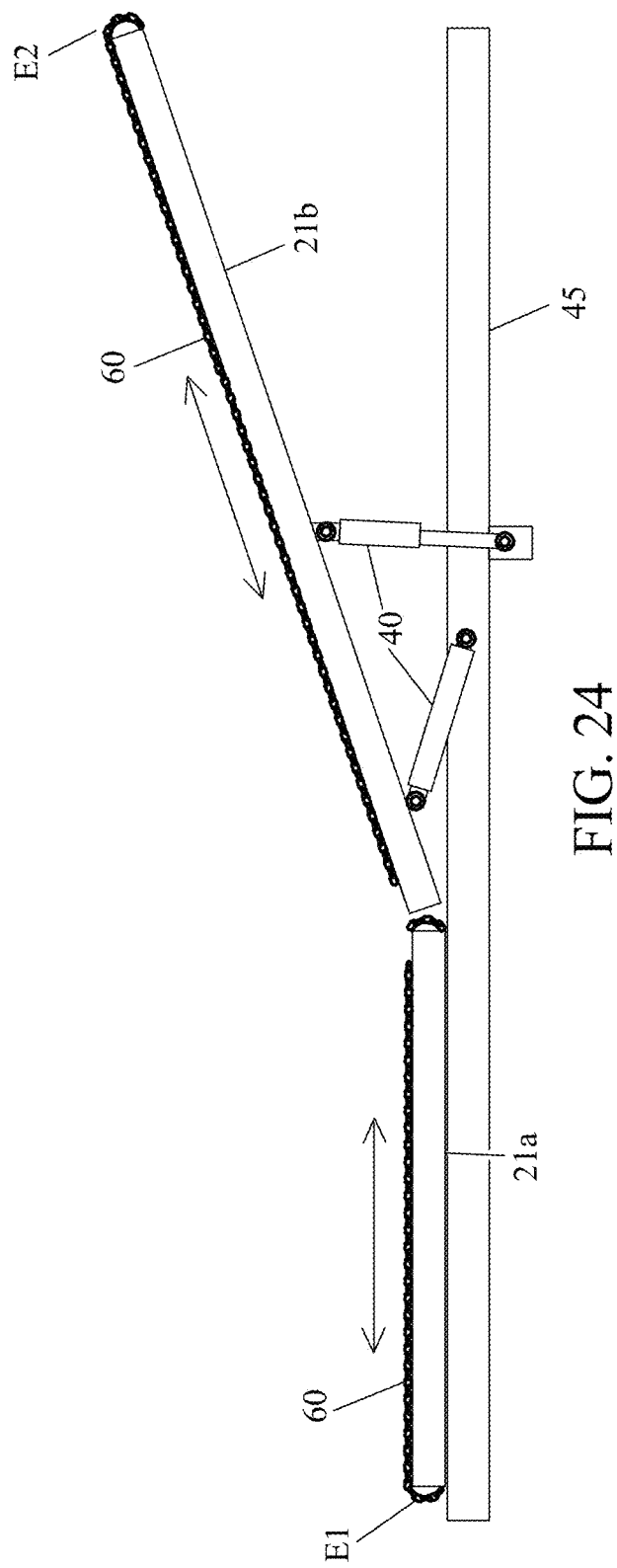
FIG. 24 shows the storage box carrier of a mobile picking platform with a chain conveyor, a fixed first carrier section, and a second carrier section having to lifting mechanisms.

In one embodiment, shown in FIG. 24, the pivot 28 and hinge 29 are removed, the first carrier section 21a is fixed, and the second carrier section 21b is provided with multiple lifting mechanisms 40, such as hydraulic pistons. The conveyor rollers 55 of the first carrier section 21a and the second carrier section 21b also replaced with a storage box drive in the form of a chain conveyor 60. When loading empty storage boxes 13, the second carrier section 21b is raised in a substantially horizontal orientation to an elevated loading position. The chain conveyor 60 is then run in the forward direction until second carrier section 21b is full of empty storage boxes 13. The second carrier section 21b is then lowered to align with the first carrier section 21a. Once aligned, the second carrier section 21b transfers the empty storage boxes 13 to the first carrier section 21a, and is then elevated again to receive more empty storage boxes 13. Once the second carrier section 21b is full of empty storage boxes 13, an end of the second carrier section 21b near the first carrier section 21a is lowered, placing the second carrier section 21b in the pick position for continued harvesting shown in FIG. 24. This configuration allows greater range of motion for the second carrier section 21b, and enables a variable tilt of the second carrier section 21b and independent elevation selection for the first and second end of the second carrier section 21b for optimum storage box 13 filling.

In some embodiments, shown in FIGS. 27A-28B, the first carrier section 21a and second carrier section 21b are fixed together forming a single unitary storage box carrier 21. It will be understood that in these embodiments the first carrier section 21a and second carrier section 21b need not be physically distinct elements, and the unitary storage box carrier 21 may be of a continuous construction from a first end E1 to the second end E2. In some embodiments, shown in FIGS. 27A-27B, the unitary storage box carrier 21 moves between a pick position, shown in FIG. 27A, a load position, and an unload position, shown in FIG. 27B, by a lifting mechanism 40 rotating the unitary storage box carrier 21 about a pivot 28.

In other embodiments, shown in FIGS. 28A-28B, the pivot 28 is removed, and a second lifting mechanism 40 is included. In these embodiments, the unitary storage box carrier 21 moves between a pick position, shown in FIG. 28A, a load position, and an unload position, shown in FIG. 28B, by independently adjusting each of the lifting mechanisms 40 to bring the first end E1 and second end E2 of the unitary storage box carrier independently to an elevation that is appropriate for loading, unloading, and picking.

Figure 25:
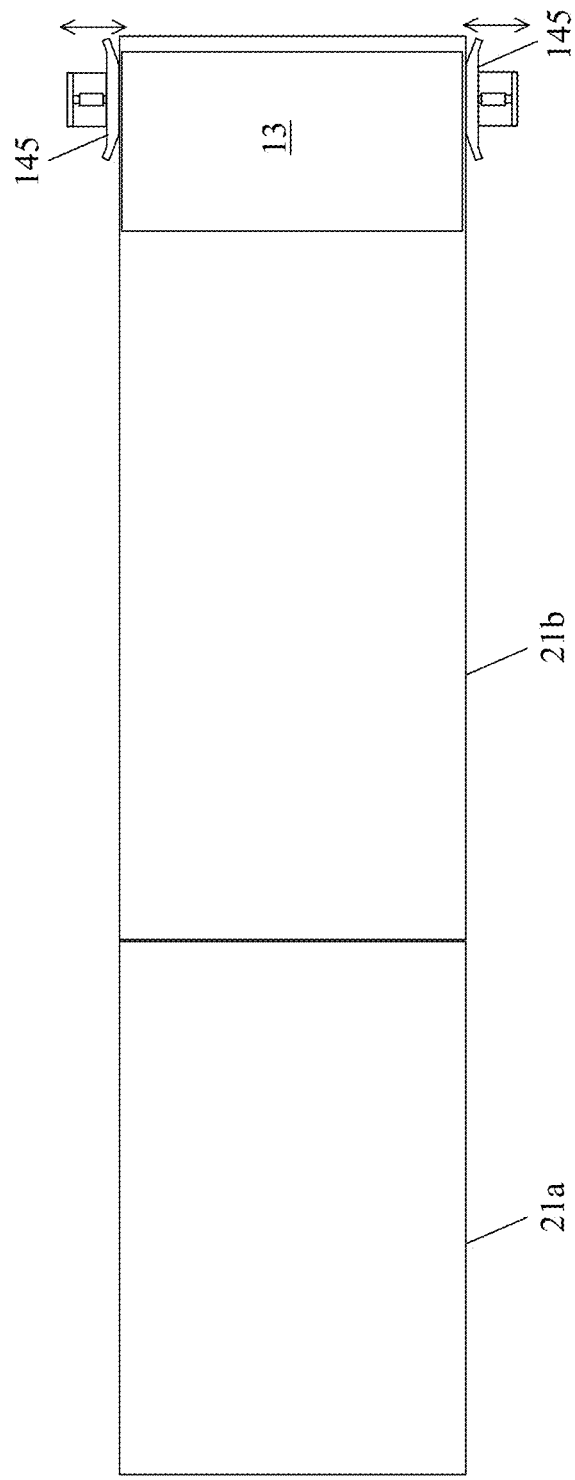
FIG. 25 shows the storage box carrier of a mobile picking platform with a clamp brake.

In one embodiment, shown in FIG. 25, a clamp brake 145 replaces the chain 115 and rope 125 restraint used to control storage box 13 movement when unloading. The brake 145 is energized prior to the storage box carrier 21 being tipped downward to the unload position. When the storage box carrier 21 reaches the unload position, the brake 145 is released and full storage boxes 13 may move to the ground.

In another embodiment, shown in FIG. 19, a retractable mechanical stop 150 is included at the second end E2 of the storage box carrier 21. The retractable mechanical stop 150 prevents full storage boxes 13 from moving past the second end E2 of the storage box carrier 21 until the storage box carrier 21 is fully in the unload position. Retraction of the retractable mechanical stop 150 may be under the operators control via a cylinder, or initiated automatically when the storage box carrier 21 reaches a specific position. In an automatic embodiment, the retractable mechanical stop 150 retracts when the storage box carrier 21 is fully in the unload position, and extends when the storage box carrier 21 is not in the unloading position. Micro-switches or other sensors may be used to detect when the storage box carrier 21 is in a position in which the retractable mechanical stop 150 should be retracted.

In yet another embodiment, shown in FIGS. 26A-26B, the storage box carrier 21 may have a lifting brake 155 with an up position and a down position. In these figures, the second carrier section 21b of the storage box carrier 21 has a brake 155 capable of vertical motion. In this illustration motion of the brake 155 is controlled by an actuator 170 coupled to the brake 155 through a linkage 160. This configuration is shown for illustrative purposes only, and it will be understood that the brake 155 may utilize any of a variety of actuators 170, including, but not limited to, hydraulic pistons, electric solenoids, and mechanical actuators, or a combination thereof, whether acting directly on the brake 155 or coupled to the brake 155 by any type of linkage known in the art. In a down position, shown in FIG. 26A the an upper surface of the brake 155 is located at approximately an upper side of the second carrier section 21b, so that storage boxes 13 may freely pass over the brake 155, whether the storage boxes 13 are supported by a chain conveyor 60, as shown in FIGS. 26A-26B, conveyor rollers 55, or a slip sheet 80. Thus, when the brake 155 is in the down position, storage boxes 13 may readily move along the storage box carrier for loading purposes, for example.

As shown in FIG. 26B, when the brake 155 is in an up position, an upper surface of the brake 155 extends above an upper surface of the second carrier section 21b as well as above a chain conveyor 60 or conveyor rollers 55 when present. Thus, a storage box 13 located on the second carrier section 21b above the brake 155 will be lifted above the chain conveyor 60 or conveyor rollers 55 by the brake 155 when the brake 155 is in the up position, and motion of the storage box 13, and other storage boxes 13 on the storage box carrier 21 toward the second end E2 of the storage box carrier 21 will be prevented. As shown in FIG. 26B, the brake 155 may be placed in the up position at any time, however in preferred embodiments the brake 155 is moved to the up position when the storage box carrier 21 is placed in a horizontal position, and may prevent movement of storage boxes 13 until the second end E2 of the storage box carrier 21 contacts a ground surface. When the second end E2 of the storage box carrier 21 contacts a ground surface, the brake 155 may be returned to the down position, allowing storage boxes 13 on the storage box carrier 21 to move unimpeded to the ground surface.

High friction materials, such as rubber, may be applied to the brake 155 to increase frictional forces between the brake 155 and the storage boxes 13. Additionally, or alternatively, surface features may be added to a top surface of the brake 155 to similarly increase frictional forces between the brake 155 and the storage boxes 13. When a slip sheet 80 is used to transfer storage boxes 13 between the mobile picking platform 20 and a ground surface, the brake 155 operates in the same manner, and frictional forces between the brake 155 and the slip sheet 80 prevent the slip sheet 80, and the storage boxes 13 resting on the slip sheet 80, from moving toward the second end E2 of the storage box carrier 21.

Some environmental conditions, such as excessively soft ground resulting from heavy rains, for example, may make transfer of full storage boxes 13 onto the ground undesirable. Thus, in some embodiments, the shuttle trailer 23 may be moved under the raised storage unit 22 and full storage boxes 13 may be transferred directly onto the shuttle trailer 23. Similarly when a slip sheet 80 system shown in FIG. 9B is used, the slip sheet 80 and storage boxes 13 on the slip sheet 80 may be directly transferred between the storage box carrier 21 and the shuttle trailer 23 by moving the shuttle trailer 23 underneath the raised storage unit 22.

While the mobile picking platform 20 described herein has been discussed primarily in relation to orchard harvesting operations, the mobile picking platform 20 may also be repurposed to various other orchard maintenance activities. For example the mobile picking platform 20 may be used for hand thinning, pruning, staking, and trellising of trees. Additionally, the mobile picking platform 20 may also be configured to other harvesting operations. For example, a configuration adapted to vineyard operations allows grape pickers to transfer grape bunches directly from vines to storage boxes 13.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A mobile picking platform system for traveling along a ground surface adjacent to at least one row of agricultural products, optimizing picking operations of the agricultural products growing from the ground surface, comprising:
   a) a mobile picking platform, comprising:
      i) a mobile carriage configured for movement along the ground surface, having a first end, a second end and a plurality of sides between the first end and the second end;
      ii) a plurality of picking stations supported on the mobile carriage of the mobile picking platform at a plurality of heights above the ground surface, and being extended laterally from at least one of the plurality of sides of the mobile carriage of the mobile picking platform by lateral extensions; and iii) a storage box carrier mounted on the mobile carriage of the mobile picking platform, comprising:
  A) a first carrier section having a first end and a second end;
  B) a second carrier section with a first end adjacent to the second end of the first carrier section and a second end, the second carrier section having a load position in which the second end of the second carrier section is elevated above the ground surface, an unload position in which the second end of the second carrier section is adjacent to the ground surface, and a pick position in which storage boxes on the storage box carrier are positioned proximate to each of the plurality of picking stations mounted on the mobile carriage; and
  C) a first lifting mechanism supporting the second carrier section on the mobile carriage of the mobile picking platform, for moving the second carrier section between the load position, the unload position and the pick position.

2. The mobile picking platform system of claim 1, further comprising:
b) a storage unit for carrying storage boxes configured for movement along the ground surface, comprising:
  i) a storage unit mobile carriage configured for movement along the ground surface;
  ii) a storage unit bed mounted to the storage unit mobile carriage, having a first end, a second end, a down position, an up position in which a storage box on the ground surface passes underneath the storage unit bed, and an intermediate position in which the first end of the storage unit bed is in alignment with the second end of the second carrier section of the storage box carrier when the second carrier section of the storage box carrier of the mobile picking platform is in the load position;
  iii) a storage unit lifting mechanism mounted on the storage unit mobile carriage and coupled to the storage unit bed, for moving the storage unit bed between the up position and the down position through the intermediate position; and
  iv) a storage box drive unit mounted on the storage unit bed for moving storage boxes on the storage unit bed toward the first end of the storage unit bed.

3. The mobile picking platform system of claim 2, wherein the storage unit is coupled to the mobile picking platform by an articulated coupling.

4. The mobile picking platform system of claim 2, wherein the storage unit further comprises a drive system comprising at least one of an electric drive, a hydraulic drive, or a mechanical drive.

5. The mobile picking platform system of claim 4, wherein the storage unit is propelled by at least one set of tracks.

6. The mobile picking platform system of claim 2, further comprising a shuttle trailer comprising:
  i) a shuttle trailer mobile carriage configured for movement along the ground surface, with a first side, a second side, and a center between them;
  ii) a first lifting arm attached to the first side of the shuttle trailer mobile carriage by a lifting mechanism, having a plurality of forks movable between an empty position away from the center of the shuttle trailer mobile carriage, a carry position toward the center of the shuttle trailer mobile carriage, a down position adjacent the ground surface, and an up position in which the storage unit bed passes under the plurality of forks of the first lifting arm when the storage unit bed is in the down position; and
  iii) a second lifting arm opposite the first lifting arm, attached to the second side of the shuttle trailer mobile carriage by a lifting mechanism, having a plurality of forks movable between an empty position away from the center of the shuttle trailer mobile carriage, a carry position toward the center of the shuttle trailer mobile carriage, a down position adjacent the ground surface, and an up position in which the storage unit bed passes under the plurality of forks of the first lifting arm when the storage unit bed is in the down position.

7. The mobile picking platform system of claim 6, wherein the shuttle trailer further comprises a drive system comprising at least one of an electric drive, a hydraulic drive, or a mechanical drive.

8. The mobile picking platform system of claim 7, wherein the shuttle trailer is propelled by at least one set of tracks.

9. The mobile picking platform system of claim 1, further comprising a shuttle trailer, comprising:
  i) a shuttle trailer mobile carriage configured for movement along the ground surface;
  ii) a shuttle trailer bed mounted to the shuttle trailer mobile carriage, having a first end and a second end, a down position in which the first end of the bed of the shuttle trailer is adjacent to the ground surface, and an up position in which the first end of the shuttle trailer bed is raised from the ground surface;
  iii) a shuttle trailer lifting mechanism mounted on the shuttle trailer mobile and coupled to the shuttle trailer bed, for moving the shuttle trailer bed between the up position and the down position; and
  iii) a storage box drive unit mounted on the shuttle trailer bed for moving storage boxes along the shuttle trailer bed, such that when the first end of the shuttle trailer bed is in the up position, the storage box drive unit transfers storage boxes between the second end of the shuttle trailer bed and an adjacent mobile picking platform or an adjacent storage unit, and when the first end of the shuttle trailer bed is in the down position, the storage box drive unit transfers storage boxes between the shuttle trailer bed and the ground surface.

10. The mobile picking platform system of claim 9, wherein the storage box drive unit of the shuttle trailer comprises conveyor rollers.

11. The mobile picking platform system of claim 9, wherein the storage box drive unit of the shuttle trailer comprises a chain conveyor.

12. The mobile picking platform system of claim 9, wherein the shuttle trailer further comprises a drive system comprising at least one of an electric drive, a hydraulic drive, or a mechanical drive.

13. The mobile picking platform system of claim 12, wherein the shuttle trailer is propelled by at least one set of tracks.

14. The mobile picking platform system of claim 1, wherein the second end of the first carrier section is coupled to the first end of the second carrier section by a hinge, and the second carrier section is rotatably coupled to the mobile carriage of the mobile picking platform by a pivot, such that when the storage box carrier is oriented in the load position the first carrier section and the second carrier section are aligned at the hinge and the storage box carrier is angled downward from the second end of the second carrier section toward the hinge, when the storage box carrier is in the unload position the first carrier section the second carrier section are aligned at the hinge and the storage box carrier is angled upward from the second end of the second carrier section toward the hinge, and when the storage box carrier is in the pick position the first carrier section is substantially horizontal and the second carrier section is angled upward at the hinge.

15. The mobile picking platform system of claim 1, wherein the first carrier section is fixed to the mobile carriage of the mobile picking platform in a substantially horizontal orientation, the second carrier section further comprises a second lifting mechanism, and an elevation of the first end of the second carrier section and an elevation of the second end of the second carrier section are independently adjustable.

16. The mobile picking platform system of claim 1, wherein the second end of the first carrier section is coupled to the first end of the second carrier section by a hinge, the first carrier section fixed to the mobile carriage of the mobile picking platform in a substantially horizontal orientation, and the first lifting mechanism of the second carrier section moves the second end of the second carrier section between the unload position, the pick position, and a load position.

17. The mobile picking platform system of claim 1, wherein the second end of the first carrier section is fixedly coupled to the first end of the second carrier section to form a unitary storage box carrier with a first end being the first end of the first carrier section and a second end being the second end of the second carrier section, and the unitary storage box carrier is rotatably coupled to the mobile carriage of the mobile picking platform by a pivot, such that when the unitary storage box carrier is oriented in the load position the unitary storage box carrier is angled upward from the first end of the unitary storage box carrier, when the unitary storage box carrier is in the unload position the unitary storage box carrier is angled upward from the second end of the unitary storage box carrier, and when the unitary storage box carrier is in the pick position the unitary storage box carrier is angled upward at the from the first end of the unitary storage box carrier.

18. The mobile picking platform system of claim 1, wherein the second end of the first carrier section is fixedly coupled to the first end of the second carrier section forming a unitary storage box carrier with a first end being the first end of the first carrier section and a second end being the second end of the second carrier section, and the unitary storage box carrier further comprises a second lifting mechanism, and an elevation of the first end of the unitary storage box carrier and an elevation of the second end of the unitary storage box carrier are independently adjustable.

19. The mobile picking platform system of claim 1, wherein the first carrier section of the storage box carrier further comprises a storage box transport mechanism.

20. The mobile picking platform system of claim 1, wherein the second carrier section of the storage box carrier further comprises a storage box transport mechanism.

21. The mobile picking platform system of claim 1, wherein the second carrier section further comprises a retractable mechanical stop at the second end of the second carrier section.

22. The mobile picking platform system of claim 1, wherein the second end of the second carrier section further comprises a storage box brake.

23. The mobile picking platform system of claim 1, wherein the mobile picking platform is self-propelled by a drive system comprising at least one of an electric drive, a hydraulic drive, or a mechanical drive.

24. The mobile picking platform system of claim 23, wherein the mobile picking platform is propelled by at least one set of tracks.

25. The mobile picking platform system of claim 23, wherein the mobile carriage of the mobile picking platform further comprises at least two steerable wheels and at least one control station coupled to the steerable wheels.

26. The mobile picking platform system of claim 1, wherein the height above the ground surface of at least one of the plurality of picking stations of the mobile picking platform is adjustable.

27. The mobile picking platform system of claim 1, wherein the lateral extension extending at least one of the plurality of picking stations of the mobile picking platform from at least one of the plurality of sides of the mobile carriage of the mobile picking platform is adjustable.

\* \* \* \* \*